United States Patent
Kawamoto

[11] Patent Number: 6,009,241
[45] Date of Patent: *Dec. 28, 1999

[54] PRINTING GRADE CONTROL

[75] Inventor: Hirokazu Kawamoto, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/675,099

[22] Filed: Jul. 3, 1996

[30] Foreign Application Priority Data

Jul. 4, 1995 [JP] Japan .................................. 7-168678

[51] Int. Cl.$^6$ .................................................. G06F 15/00
[52] U.S. Cl. ........................ 395/109; 395/112; 395/114; 358/447
[58] Field of Search .................................... 395/101, 102, 395/109, 110, 167, 171, 172, 128, 108, 111, 112, 114, 116, 115; 382/299; 358/428, 447, 461

[56] References Cited

U.S. PATENT DOCUMENTS

| | | | |
|---|---|---|---|
| 4,841,375 | 6/1989 | Nakajima et al. | 358/298 |
| 4,974,171 | 11/1990 | Yeh et al. | 364/519 |
| 4,995,103 | 2/1991 | Tsukada et al. | 358/451 |
| 5,157,417 | 10/1992 | Anzai | 358/298 |
| 5,239,313 | 8/1993 | Marko et al. | 358/298 |
| 5,361,329 | 11/1994 | Morita et al. | 395/102 |
| 5,502,794 | 3/1996 | Sakurai | 395/109 |
| 5,504,588 | 4/1996 | Takeuchi et al. | 395/109 |
| 5,539,525 | 7/1996 | Tanuma et al. | 358/298 |
| 5,548,319 | 8/1996 | Kwon | 358/298 |
| 5,548,690 | 8/1996 | Shimada | 395/112 |
| 5,604,846 | 2/1997 | Kadota | 395/114 |
| 5,687,296 | 11/1997 | Shimada | 395/102 |
| 5,841,552 | 11/1998 | Atobe | 358/447 |

FOREIGN PATENT DOCUMENTS 0575134 12/1993 European Pat. Off. .
0588513 3/1994 European Pat. Off. .

*Primary Examiner*—Dov Popovici
*Assistant Examiner*—Mark Wallerson
*Attorney, Agent, or Firm*—Fitzpatrick Cella Harper & Scinto

[57] ABSTRACT

A printing system includes an information processing apparatus for generating print data and a printing apparatus, in which the information processing apparatus is provided with conditions for deciding the resolution and/or gray scale gradation of the print data, and continue or cancel printing processing by an operator's decision based upon the condition, in case of continuation of the printing processing, a command for lowering resolution and/or gradation at time of printing is inserted into the print data, which is transmitted to the printing apparatus, on a per-printing-job basis, and produces an output in accordance with the command by the printing apparatus.

75 Claims, 28 Drawing Sheets

FIG. 5

FIRST-PAGE INDEX 71

| OBJECT TYPE | NUMBER OF OCCURRENCES IN PAGE | COLOR | SIZE |
|---|---|---|---|
| CHARACTER | 3 | MONOCHROMATIC | 96 |
| IMAGE | 1 | COLOR | 409600 |

SECOND-PAGE INDEX 72

| OBJECT TYPE | NUMBER OF OCCURRENCES IN PAGE | COLOR | SIZE |
|---|---|---|---|
| CHARACTER | 1 | MONOCHROMATIC | 30 |
| RECTANGLE | 3 | COLOR | 232 |

THIRD-PAGE INDEX 73

| OBJECT TYPE | NUMBER OF OCCURRENCES IN PAGE | COLOR | SIZE |
|---|---|---|---|
| CHARACTER | 5 | MONOCHROMATIC | 298 |
| RECTANGLE | 1 | MONOCHROMATIC | 15 |

FOURTH-PAGE INDEX 74

| OBJECT TYPE | NUMBER OF OCCURRENCES IN PAGE | COLOR | SIZE |
|---|---|---|---|
| CHARACTER | 3 | MONOCHROMATIC | 96 |

FIFTH-PAGE INDEX 75

| OBJECT TYPE | NUMBER OF OCCURRENCES IN PAGE | COLOR | SIZE |
|---|---|---|---|
| CHARACTER | 6 | MONOCHROMATIC | 1037 |

JOB INDEX 76

| OBJECT TYPE | NUMBER OF OCCURRENCES IN PAGE | COLOR | SIZE |
|---|---|---|---|
| CHARACTER | 18 | MONOCHROMATIC | 1557 |
| IMAGE | 1 | COLOR | 409600 |
| RECTANGLE | 1 | MONOCHROMATIC | 15 |
| RECTANGLE | 3 | COLOR | 232 |

FIG. 6

◇ PRINT DATA STREAMS

JOB INDEX     <ESC> [1 : 18 : 1557 : 4 : 1 : 409600 : 5 : 1 : 15 : 6 : 1 : 2328i

FIRST-PAGE INDEX     <ESC> [1 : 3 : 96 : 4 : 1 : 409600&i

SECOND-PAGE INDEX     <ESC> [1 : 1 : 30 : 6 : 1 : 2328i

THIRD-PAGE INDEX     <ESC> [1 : 5 : 298 : 5 : 1 : 16&i

FOURTH-PAGE INDEX     <ESC> [1 : 3 : 96&i

FIFTH-PAGE INDEX     <ESC> [1 : 6 : 10378i

FIG. 7

FILE BEGINNING →

[JOB START INSTRUCTION] [PRINTING ENVIRONMENT SETTING INSTRUCTION GROUP] . <ESC>[1:18:1557:4:1:409600:5:1:15:6:1:232&i <ES
C>[1:3:96:4:1:409600&i
. . . [CHARACTER PRINT INSTRUCTION] [CHARACTER PRINT INSTRUCTION] . . . [CHARACTER PRINT INSTRUCTION] .
. . . . . . . . . . [IMAGE PAINT INSTRUCTION] . . . . . . . . . . . . . .
PAGE FEED CODE (FF) <ESC>[1:1:30:6:1:2328&i
. . . [RECTANGLE PAINT INSTRUCTION] . . [RECTANGLE PAINT INSTRUCTION] . [RECTANGLE PAINT INSTRUCTION] . . . . . [CHARACTER
PRINT INSTRUCTION] . . . . . . . . FF <ESC>[1:5:298:5:1:16&i [CHARACTER PRINT INSTRUCTION] . . . . . . . . [RECTANGLE PAINT
INSTRUCTION] . . . . . . . . . . . . . . . . . . . . . . . . . . . . . . . . .
. . . . . . . . [CHARACTER PRINT INSTRUCTION] . [CHARACTER PRINT INSTRUCTION] . [CHARACTER PRINT INSTRUCTION] .FF <ESC>[1:6:1037&i. [CHARACTER
[1:3:96&i . . [CHARACTER PRINT INSTRUCTION]
. . . . . . . . . . [CHARACTER PRINT INSTRUCTION] [CHARACTER PRINT INSTRUCTION] [CHARACTER PRINT INSTRUCTION] [CHARACTER
PRINT INSTRUCTION] . [CHARACTER PRINT INSTRUCTION] . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . . .
. . . . . . [CHARACTER PRINT INSTRUCTION] . . [JOB END INSTRUCTION] . . . . . . . . . . . . . . . ← FILE END

PRINT INSTRUCTION] . . . . . . . . . . .

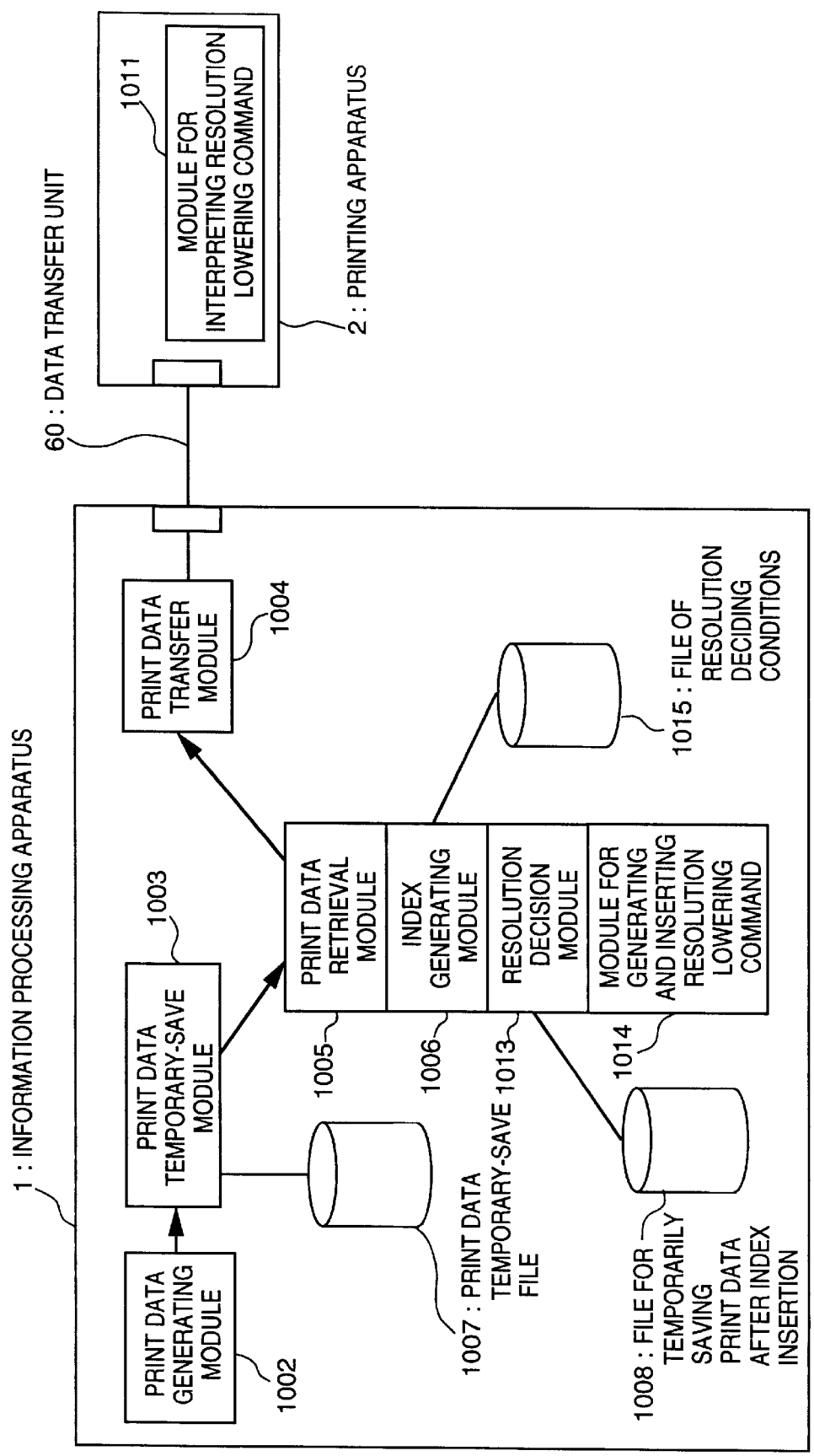

FIG. 11

◊ RESOLUTION LOWERING COMMAND

<ESC> [$$$

PAGE FEED CODE

FIG. 12

FILE BEGINNING →

[JOB START INSTRUCTION] [PRINTING ENVIRONMENT SETTING INSTRUCTION GROUP] <ESC> [$$$ . . . . . . . . . . . . . . . . . . . . .
. . . . . . . . . . . . . . . . . . . . . . . . . . . . . . . . . [CHARACTER PRINT INSTRUCTION] [CHARACTER PRINT INSTRUCTION] . . . . .
[CHARACTER PRINT INSTRUCTION] . . . . . . . . . . . . . . . . . . . . . . . . . . . . . . . [IMAGE PAINT INSTRUCTION] . . . . . . . .
. . . . . . . . . . . . . . [RECTANGLE PAINT INSTRUCTION] . . . . . . . . [RECTANGLE PAINT INSTRUCTION] . . . . . . . . . . . . . . .
. . . [RECTANGLE PAINT INSTRUCTION] . . . . . FF (FF) [CHARACTER PRINT INSTRUCTION] . . . . . [RECTANGLE PAINT INSTRUCTION] . . . . . .
[CHARACTER PRINT INSTRUCTION] [CHARACTER PRINT INSTRUCTION] [CHARACTER PRINT INSTRUCTION] FF [CHARACTER PRINT INSTRUCTION] . . . . .
[CHARACTER PRINT INSTRUCTION] FF [CHARACTER PRINT INSTRUCTION] [CHARACTER PRINT INSTRUCTION] . . . . . . . . . . . . . . . . . . . .
[CHARACTER PRINT INSTRUCTION] [CHARACTER PRINT INSTRUCTION] [CHARACTER PRINT INSTRUCTION] . . . . . . . . . . . [JOB END INSTRUCTION]

→ FILE END

F I G. 13

EXAMPLE OF RESOLUTION LOWERING CONDITIONS

[TRANSMISSION DATA SIZE PER PAGE] > 4 Mbytes

[TRANSMISSION DATA SIZE PER JOB} > 16 Mbytes

[COLOR IMAGE] > 100 * 100 DOTS

[MONOCHROMATIC IMAGE] > A4 PAGE SIZE

ENLARGEMENT / REDUCTION

FIG. 19
◊ RESOLUTION LOWERING COMMAND  ◊ GRADATION LOWERING COMMAND
<ESC> [$$$  <ESC> [###

PAGE FEED CODE

FILE BEGINNING →

[JOB START INSTRUCTION] [PRINTING ENVIRONMENT SETTING INSTRUCTION GROUP] <ESC> [$$$ <ESC> [### . . . . . . . . . . . . . .
. . . . . . . . . . . . . . . . . . .[CHARACTER PRINT INSTRUCTION] . [CHARACTER PRINT INSTRUCTION] . . . . . . . . . . . . .
[CHARACTER PRINT INSTRUCTION] . . . . . . . . . . . . . . . . . . . . . . . . . . [IMAGE PAINT INSTRUCTION] . . . . . . . .
. . . . . . . . . . . . (FF) . . . . . . . . . . . . . . . . . . . . . . . . . . . . . . . . . . . . . . . . . . . . . . .
. . . . . . [RECTANGLE PAINT INSTRUCTION] . [RECTANGLE PAINT INSTRUCTION] . . [RECTANGLE PAINT INSTRUCTION] . . . . . . .
[CHARACTER PRINT INSTRUCTION] . . . . FF [CHARACTER PRINT INSTRUCTION] . . . . . . . . . . . . . . . . . . . . . . . . . .
[CHARACTER PRINT INSTRUCTION] [CHARACTER PRINT INSTRUCTION] [CHARACTER PRINT INSTRUCTION] FF [CHARACTER PRINT INSTRUCTION] .
[CHARACTER PRINT INSTRUCTION] FF [CHARACTER PRINT INSTRUCTION] [CHARACTER PRINT INSTRUCTION] [CHARACTER PRINT INSTRUCTION] .
[CHARACTER PRINT INSTRUCTION] [CHARACTER PRINT INSTRUCTION] [CHARACTER PRINT INSTRUCTION] . . . . . . . [JOB END INSTRUCTION]

← FILE END

GRADATION DECIDING CONDITIONS

[TRANSMISSION DATA SIZE PER PAGE] > 4 Mbytes

[TRANSMISSION DATA SIZE PER JOB] > 20 Mbytes

[24 BIT COLOR IMAGE] > 2000 * 2500 DOTS

FIG. 23
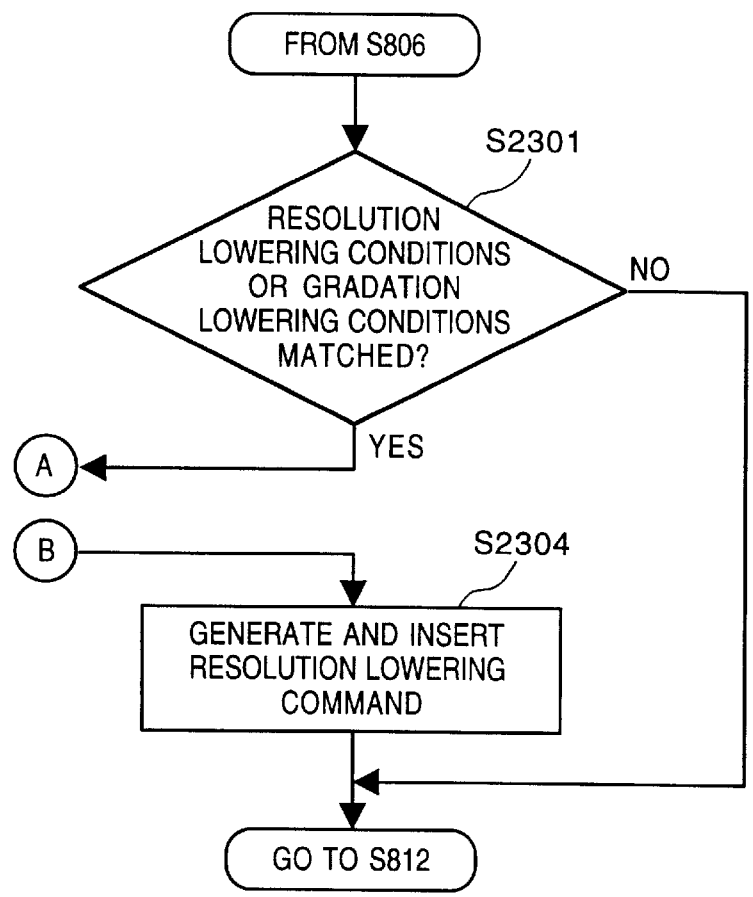
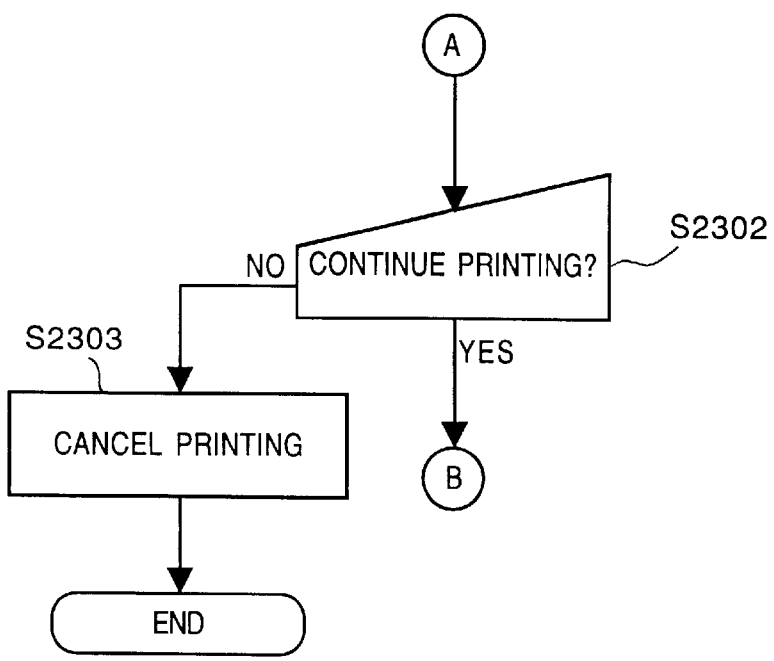

FIG. 26

A DECLINE IN RESOLUTION OR GRADATION HAS OCCURRED.
DO YOU WISH TO CONTINUE PRINTING?

YES    NO

FIG. 28

FIRST-BAND INDEX 2871

| OBJECT TYPE | NUMBER OF OCCURRENCES IN BAND | COLOR | SIZE |
|---|---|---|---|
| CHARACTER | 1 | MONOCHROMATIC | 20 |
| IMAGE | 1 | COLOR | 409600 |

SECOND-BAND INDEX 2872

| OBJECT TYPE | NUMBER OF OCCURRENCES IN BAND | COLOR | SIZE |
|---|---|---|---|
| CHARACTER | 0 | MONOCHROMATIC | 0 |

THIRD-BAND INDEX 2873

| OBJECT TYPE | NUMBER OF OCCURRENCES IN BAND | COLOR | SIZE |
|---|---|---|---|
| CHARACTER | 1 | MONOCHROMATIC | 58 |

FOURTH-BAND INDEX 2874

| OBJECT TYPE | NUMBER OF OCCURRENCES IN BAND | COLOR | SIZE |
|---|---|---|---|
| CHARACTER | 1 | MONOCHROMATIC | 18 |

FIFTH-BAND INDEX 2875

| OBJECT TYPE | NUMBER OF OCCURRENCES IN BAND | COLOR | SIZE |
|---|---|---|---|
| CHARACTER | 0 | MONOCHROMATIC | 0 |

FIRST-PAGE INDEX 2876

| OBJECT TYPE | NUMBER OF OCCURRENCES IN BAND | COLOR | SIZE |
|---|---|---|---|
| CHARACTER | 3 | MONOCHROMATIC | 96 |
| IMAGE | 1 | COLOR | 409600 |

FIG. 29

◇ PAGE DATA STREAMS

PAGE INDEX          <ESC> [2 : 3 : 96 : 4 : 1 : 409600&i

FIRST-BAND INDEX     <ESC> [2 : 1 : 20 : 4 : 1 : 409600&i

SECOND-BAND INDEX   <ESC> [2 : 0 : 0&i

THIRD-BAND INDEX     <ESC> [2 : 1 : 58&i

FOURTH-BAND INDEX   <ESC> [2 : 1 : 18&i

FIFTH-BAND INDEX      <ESC> [2 : 0 : 0&i

PRINTING GRADE CONTROL

BACKGROUND OF THE INVENTION

This invention relates to a printing apparatus in a system having the printing apparatus and an information processing apparatus such as a personal computer, and to control of the resolution and/or gradation (gray level) of the printing apparatus.

A method of controlling the printing resolution or gray level of a printing apparatus in dependence upon the complexity of the print data and the processing capability of the printing apparatus itself is known in the art.

More page printer comprises a video controller and a printer engine. The video controller receives print data described in Printer Language from a host computer or the like and develops the print data into the image data represented with a dot image matrix. To store one page of image data, large amount of memory capacity is required in the printer. As the paper size or the resolution increases, the number of bits necessary for the memory increases. To reduce the memory capacity, a band buffer technique often uses. In the band buffer technique, a page corresponding to a print image is divided into bands in a sheet feed direction. A plurality of band buffers are cyclically used for each output page, and the developing process for one band buffer and the transmitting the image data from another band buffer to the printer engine are performed in parallel. But, in some cases, like the amount of the print data in one page is too large and these data is overflowed from the print data buffer or the developing process takes too much time to prepare the image data sipping to the printer engine and has occurred the overrun error, the image data can't be printed on the sheet correctly. To alleviate these above situation, there is the method which decreases the amount of time for the developing process or the amount of memory for storing the image data by taking the lower resolution or gradation for processing the image data then the prevailing resolution or gradation.

However, it isn't determined whether takes the lower resolution or gradation until the processing time for all of the band buffer are estimated based on the received print data from host computer for one page or the print data buffer is full, herein the print data are converted into the intermediate code depending on the resolution or gradation in parallel with the printer data receiving.

Accordingly, when the need to lower printing resolution or gradation actually arises, it is necessary to invalidate processing executed thus far based upon the prevailing resolution or gradation delete the above type of the intermediate code and generate a page image whose resolution or gradation is lower than the prevailing resolution or gradation using all of the received data again to produce the image. This is disadvantageous in that rapid printout cannot be performed.

SUMMARY OF THE INVENTION

Accordingly, an object of the present invention is control of printing resolution and gray level that makes possible precise, high-speed printing even in a case where a page image is generated upon lowering resolution or gradation when an output is obtained from a printing apparatus.

According to the present invention, the foregoing object is attained by providing an information processing apparatus or driver thereof for generating print data and transmitting the print data externally, comprising generating means for generating an index which indicates a characteristic of the print data, comparator means for comparing the generated index with a predetermined value representing resolution or gradation used at time of printing, and insertion means for inserting a command in the print data in dependence upon results of the comparison, the command lowering resolution and/or gradation.

In a preferred embodiment, an operator is allowed to select, prior to insertion of the command and in dependence upon the result of comparison of the index, whether subsequent processing is to be continued.

In a preferred embodiment, the command is inserted on a per-job basis with regard to jobs contained in the print data.

In another aspect of the invention, a printing apparatus or driver thereof for developing externally generated print data into a page image and printing the page image comprises resolution/gradation altering means for altering resolution and/or gradation at time of printing in accordance with a command, which indicates a characteristic of the print data, contained in the print data.

The invention further provides a system characterized by comprising the above-mentioned information processing apparatus and printing apparatus.

In a preferred embodiment, the information processing apparatus is characterized in that the predetermined value is acquired externally or from a printing apparatus by communication on a per-job basis with regard to jobs contained in the print data.

The foregoing object is further attained by providing an information processing apparatus or driver thereof for generating print data and transmitting the print data externally, comprising generating means for generating an index which indicates a characteristic of the print data, and insertion means for inserting the generated index in the print data.

In another aspect of the invention, a printing apparatus or driver thereof for developing externally generated print data into a page image and printing the page image comprises resolution/gradation altering means for interpreting an index, which indicates a characteristic of the print data, contained in the print data and altering resolution and/or gradation at time of printing.

The invention further provides a system characterized by comprising the above-mentioned information processing apparatus and printing apparatus.

In another arrangement, the information processing apparatus may be adapted to process the print data, for the purpose of lowering resolution and/or gradation used at time of printing, in conformity with the results of comparing the index with the predetermined value.

Other objects and advantages besides those discussed above shall be apparent to those skilled in the art from the description of a preferred embodiment of the invention which follows. In the description, reference is made to the accompanying drawings, which form a part thereof, and which illustrate an example of the invention. Such example, however, is not exhaustive of the various embodiments of the invention, and therefore reference is made to the claims which follow the description of the scope of the invention.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a diagram illustrating examples of indices generated as the result of retrieving print data according to the first embodiment of the invention;

FIG. 6 is a diagram illustrating format when indices are inserted as part of print data according to the first embodiment of the invention;

FIG. 7 is a diagram illustrating an example of print data after insertion of indices (FIG. 6) in print data (FIG. 4) according to the first embodiment of the invention;

FIG. 10 is a functional block diagram illustrating the hardware architecture according to a second embodiment of the present invention;

FIG. 11 is a diagram illustrating a command for lowering resolution according to the second embodiment of the invention;

FIG. 12 is a diagram illustrating an example of print data after insertion of the command for lowering resolution according to the second embodiment of the invention;

FIG. 13 is a diagram illustrating resolution deciding conditions according to the second embodiment of the invention;

FIG. 19 is a command for reducing resolution and a command for reducing gradation according to a modification of the second embodiment of the present invention;

FIG. 20 is a diagram showing an example of print data after insertion of the command for lowering resolution according to a modification of the second embodiment of the invention;

FIG. 21 is a diagram illustrating gradation deciding conditions according to a modification of the first and second embodiments of the invention;

FIG. 23 is a flowchart illustrating processing for reducing resolution/gradation according to a modification of the second embodiment of the present invention;

FIG. 26 is a diagram illustrating a message screen according to the fifth embodiment of the invention;

FIG. 28 is a diagram illustrating examples of indices generated as the result of retrieving print data according to the another modification of the first embodiment of the invention;

FIG. 29 is a diagram illustrating format when indices are inserted as part of print data according to the modification of the first embodiment of the invention;

DESCRIPTION OF THE PREFERRED EMBODIMENTS

Embodiments of the present invention will now be described with reference to the drawings.

The architecture of the system to which the invention is applied will be described first.

Figure 1:
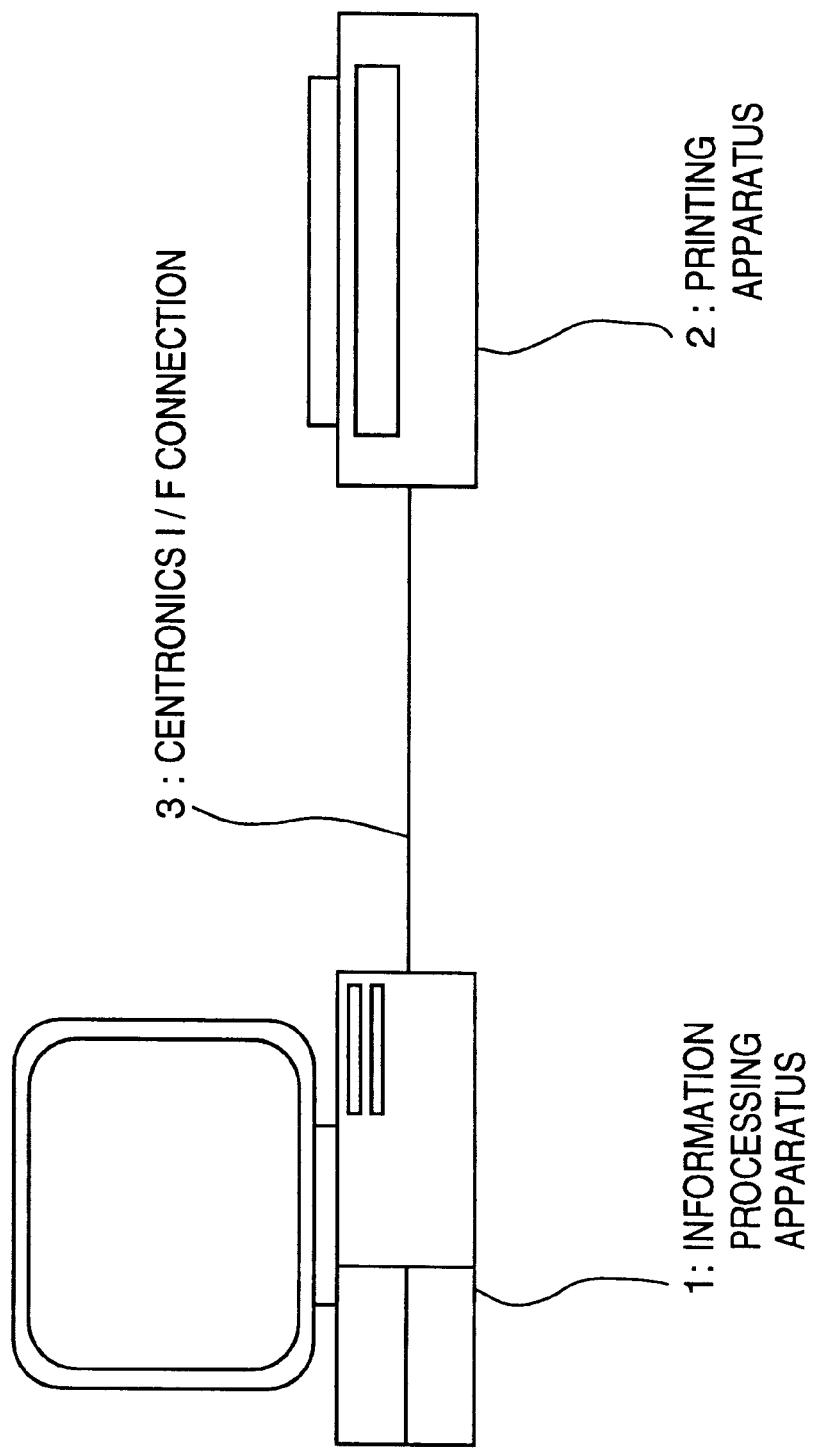
FIG. 1 illustrates the hardware implementation of the present invention.

FIG. 1 illustrates the hardware implementation of the present invention.

As shown in FIG. 1, an information processing apparatus and a printing apparatus 2 are connected via a Centronics I/F connection 3.

Figure 2:
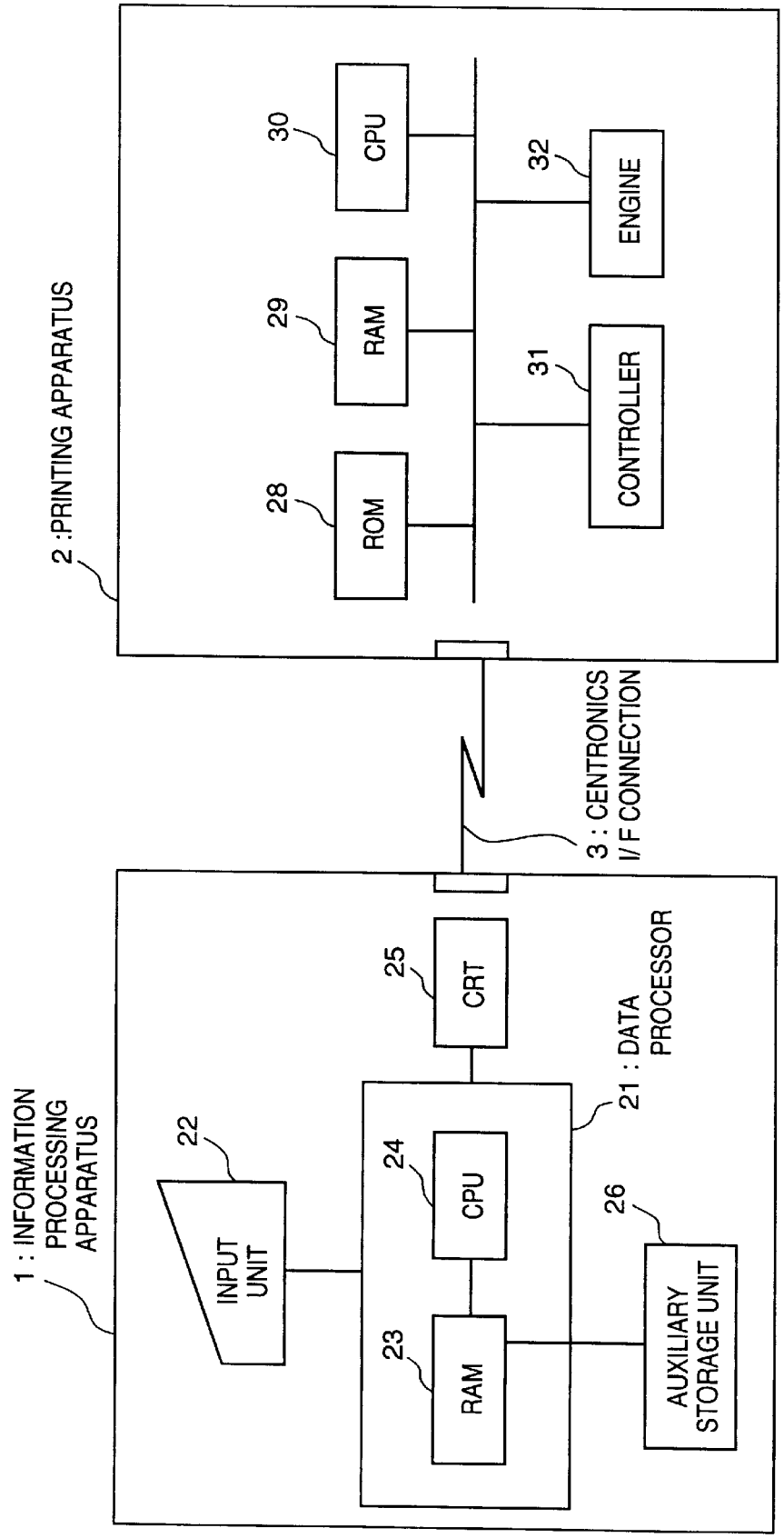
FIG. 2 is a block diagram illustrating the hardware architecture to which the present invention is applied.

FIG. 2 is a block diagram illustrating the hardware architecture to which the present invention is applied.

As shown in FIG. 2, the information processing apparatus 1 has a data processor 21, an input unit 22, a CRT 25 and an auxiliary storage unit 26. The data processor 21 is internally provided with a RAM 23 and CPU 24. The printing apparatus 2 has a ROM 28, a RAM 29, a CPU 30, a controller 31 and an engine 32. The controller 31 executes processing for actually outputting, on paper, print data received from the information processing apparatus 1 via the Centronics I/F connection 3. The engine 32 conveys the paper and performs the actual printing operation.

<First Embodiment>

The software of the first embodiment of the invention will now be described based upon the hardware shown in FIGS. 1 and 2.

Figure 3:
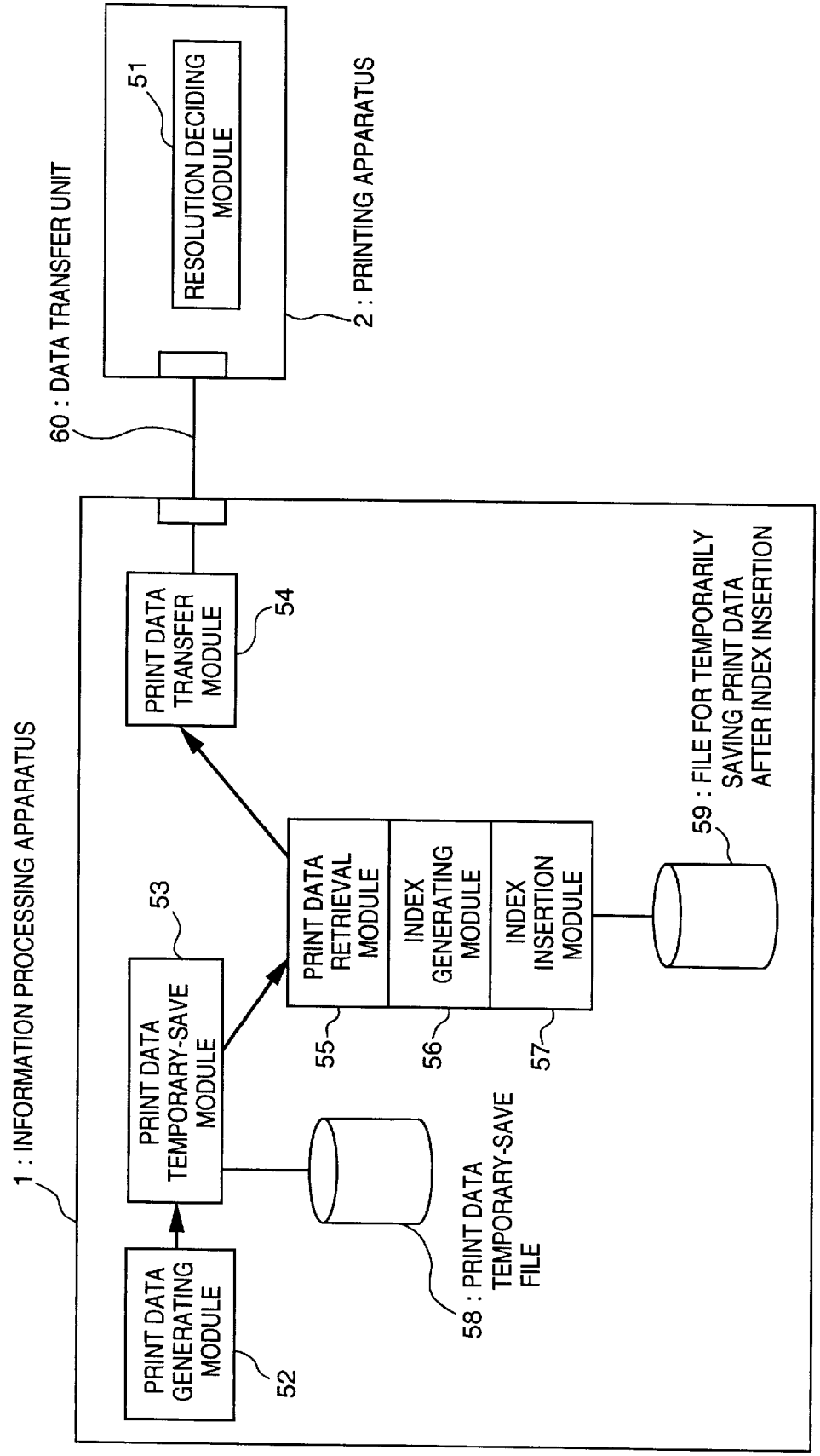
FIG. 3 is a functional block diagram illustrating the hardware architecture according to the first embodiment of the present invention.

FIG. 3 is a functional block diagram illustrating the internal functions of the hardware architecture according to the first embodiment of the present invention.

As shown in FIG. 3, the information processing apparatus 1 has a print data generating module 52 serving as printing processing means, a module 53 for temporarily saving the print data, a print data transfer module 54, a file 58 in which print data are temporarily saved, a print data retrieval module 55, an index generating module 56, an index insertion module 57 and a file 59 in which print data are saved after index insertion. The printing apparatus 2 has a module 51 for deciding printing resolution based upon indices sent as part of print data from the information processing apparatus 1 via a data transfer unit 60.

Figure 4:
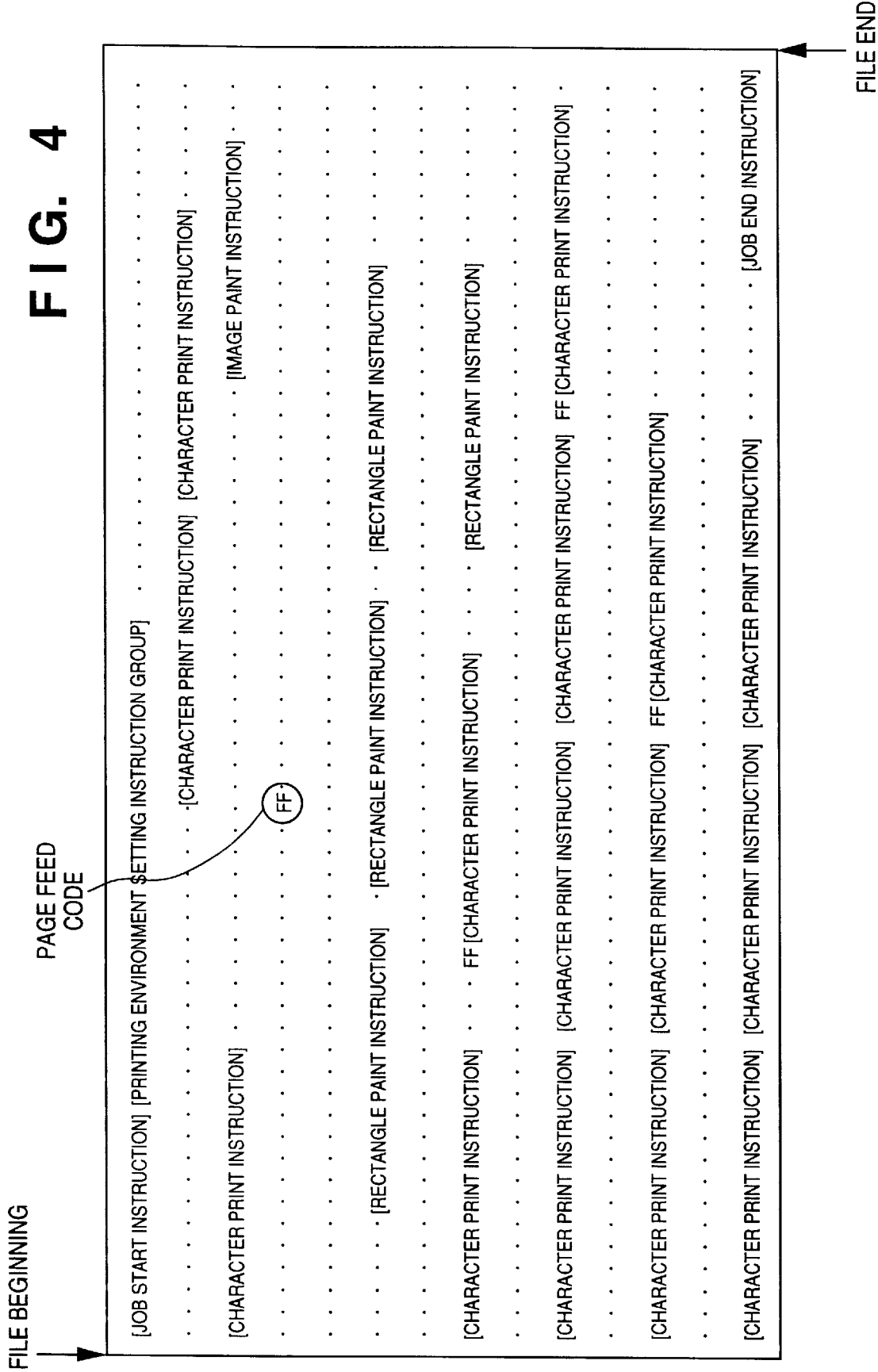
FIG. 4 is a diagram illustrating an example of print data that have been saved in a file for temporary saving of print data according to the first embodiment of the invention.

FIG. 4 is a diagram illustrating an example of print data that have been saved in the file for temporarily saving the print data according to the first embodiment of the invention.

The print data in FIG. 4 are generated in the information processing apparatus 1 by the print data generating module 52 of FIG. 3 and illustrate the content of the file temporarily saved in the module 58 by the module 53. Such instructions as a "Job Start Instruction", "Printing Environment Setting Instruction Group", etc., are markings for facilitating an understanding of the print data in the file. In actuality, these instructions are stored in a binary format. Further, "FF" represent a page feed code.

FIG. 5 is a diagram illustrating examples of indices generated as the result of retrieving print data according to the first embodiment of the invention.

FIG. 5 illustrates data, which constitute information for index generation, generated in the information processing apparatus 1 by the print data retrieval module 55 of FIG. 3. The data of FIG. 5 are generated using the RAM 29 shown in FIG. 1. In this embodiment, there are five pages of print data. The print data consist of indices 71~75, one per page, and an index 76 indicating the entirety of the print data generated from these indices.

FIG. 6 is a diagram illustrating format when indices are inserted as part of print data according to the first embodiment of the invention. FIG. 6 shows an example of a data stream generated for each index by the index generating module 56 (FIG. 3) in the information processing apparatus 1.

FIG. 7 is a diagram illustrating an example of print data after insertion of the indices of FIG. 6 in print data of FIG. 4 according to the first embodiment of the invention.

The data shown in FIG. 7 are generated in the information processing apparatus 1 by the index inserting module 57 of FIG. 3 and illustrate the print data file saved in the module 59 after the indices are inserted in the file. The indices in FIG. 7 are underlined.

Figure 8:
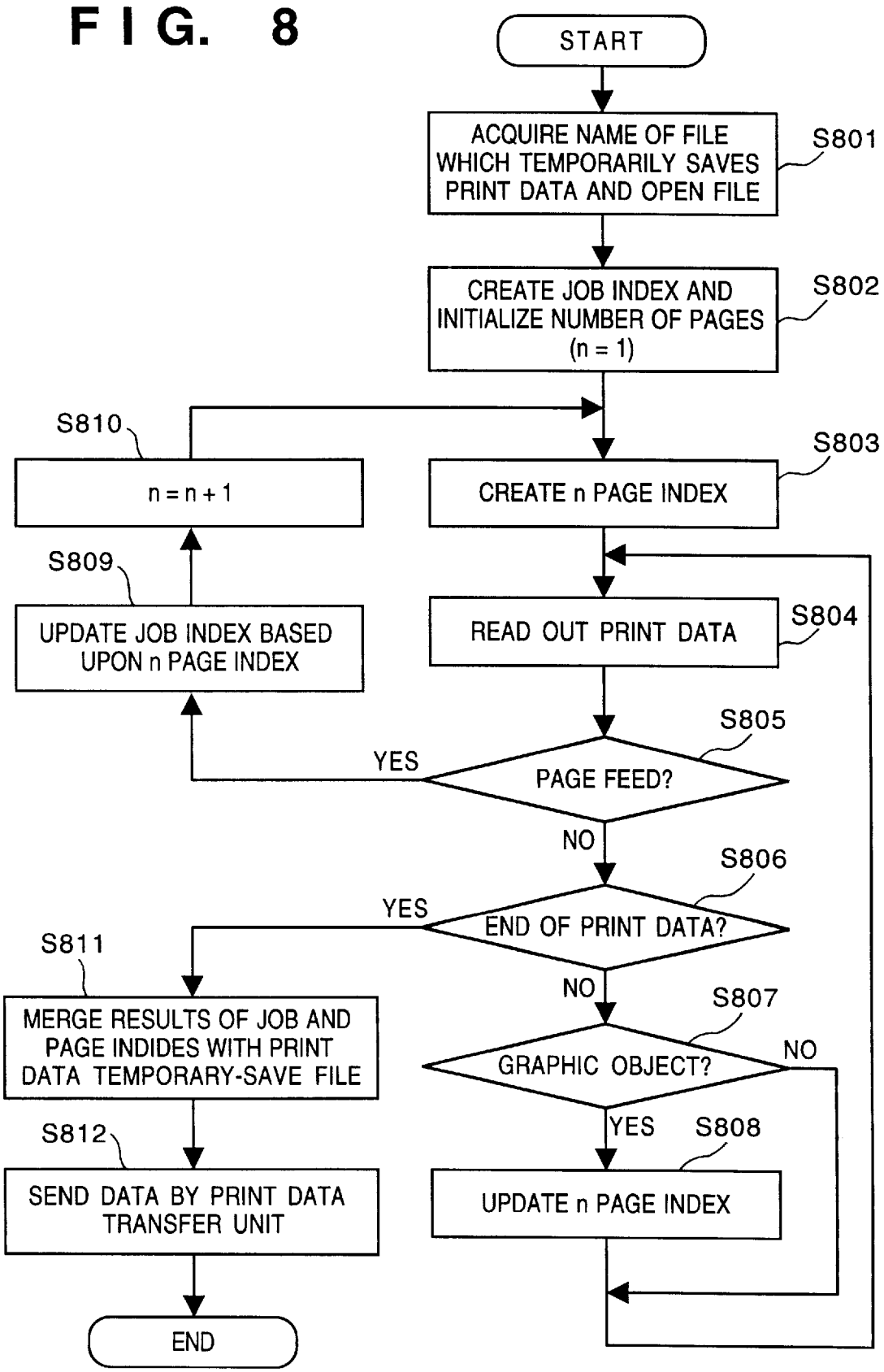
FIG. 8 is a flowchart of processing executed by an information processing apparatus according to the first embodiment of the invention.

FIG. 8 is a flowchart of processing executed by the information processing apparatus 1 according to the first embodiment of the invention. This is a flowchart of processing executed by the print data retrieval module 55, the index generating module 56 and the index insertion module 57 of FIG. 3.

Figure 9:
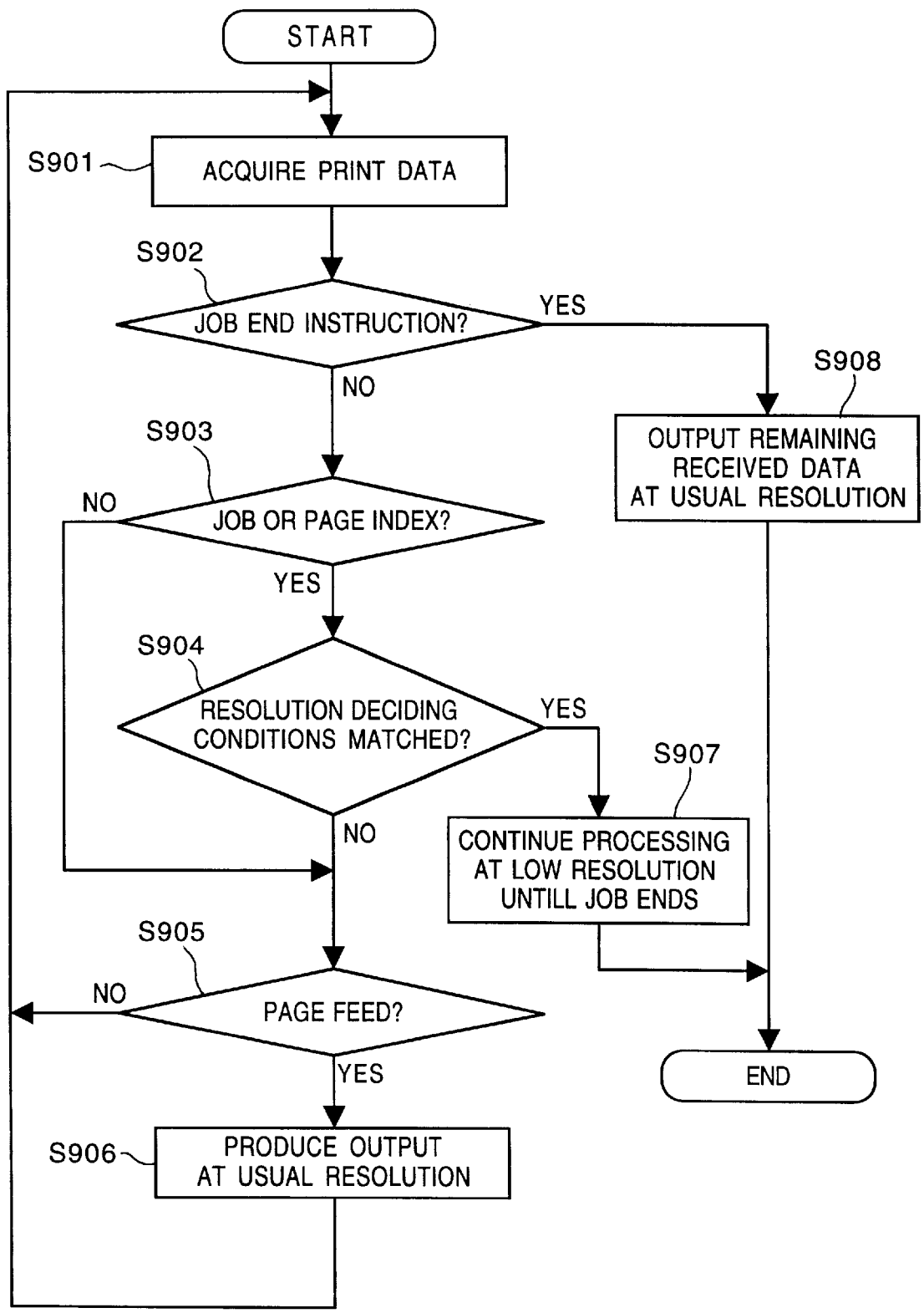
FIG. 9 is a flowchart of processing executed by the printing apparatus according to the first embodiment of the invention.

FIG. 9 is a flowchart of processing executed by the printing apparatus 2 according to the first embodiment of the invention. This is a flowchart of processing executed by the module 51 for deciding printing resolution based upon the indices of FIG. 6.

FIG. 13 is a diagram illustrating resolution deciding conditions according to first and second embodiments of the invention.

The operation of this embodiment will now be described in detail with reference mainly to the flowcharts of FIGS. 8 and 9.

As for operation in the information processing apparatus 1, print data are generated by the print data generating module 52 and the generated print data are temporarily saved in the file 58 by the module 53 which temporarily saves the print data. When generation of the print data by the print data generating module 52 is completed, the print data retrieval module 55 is called by the module 53 so that retrieval of print data, generation of indices and insertion of the indices in the print data are carried through the procedure shown in FIG. 8.

First, when the print data retrieval module 55 is called by the module 53 which temporarily saves the print data, the module 55 acquires the file name from the file 58, which is the file which temporarily saves the print data. Next, in order for the print data to be retrieved, the print data retrieval module 55 opens the file 58 (step S801). Next, the job index 76 shown in FIG. 5 is created in the RAM 23 of FIG. 2 and a variable n for the page index is initially set to 1 (step S802). The page index 71 of the first page is then generated in the RAM 23 in the same manner (step S803). Upon completion of the initialization processing described above, retrieval of the print data is actually started. First, readout of the print data is performed in units of the print commands shown in FIG. 4 (step S804). The item of print data read out first from the print data shown in FIG. 4 is the "Job Start Instruction". Next, print data from "Printing Environment Setting Instruction Group" to the end of the file are read out. In the process of reading out the print data, first it is determined whether the print data read out are indicative of page feed (step S805). If the data are not indicative of page feed ("NO" at step S805), then it is determined whether this is the end of the print data (step S806). If the answer is "NO", then it is determined whether the data are indicative of a graphic object (step S807). If the answer is "YES", then the page index is updated (step S808) and readout of print data is performed again (step S804). If it is found at step S804 that the print data indicate page feed, then the contents of the page index 71 of the first page are reflected in the job index 76 and the job index 76 is updated (step S809). This is followed by updating of a counter for generating the page index of the next page (step S810) and then by the processing of steps S803 onward. If it is found at step S806 that the print data are at an end, then the job index 76 and page indices 71~75 shown in FIG. 6 are inserted into the print data in file 58, which is the file for saving the print data. To accomplish this, the print data streams shown in FIG. 6 are generated and inserted, with the job index data being inserted to immediately follow the "Printing Environment Setting Instruction Group" and the page index data being inserted to immediately follow respective ones of the feed page codes FF, as shown in FIG. 7. As a result, a print data file into which the indices have been inserted is generated in the file 59 (step S811). Next, the print data file into which the indices have been inserted is transmitted to the printing apparatus 2 by the print data transfer module 54 via the data transfer unit 60 (step S812).

As shown in FIG. 9, the printing apparatus 2 acquires the print data via the data transfer unit 60 (step S902). If the data are indicative of a "Job End Instruction", the remainder of the received data is outputted at the usual resolution (step S908) and processing ends. If the data are not indicative of a "Job End Instruction" ("NO" at step S902), then it is determined whether the data indicate a job index or page index or not (step S903). If the data indicate neither a job index nor a page index ("NO" at step S903), then the processing of step S905 is executed. If the data indicate either a job index or a page index ("YES" at step S903), then it is determined whether the resolution deciding conditions of FIG. 13 satisfied, i.e., matched (step S904). If the resolution conditions are satisfied ("YES" at step S904), then processing is executed at low resolution until a job end instruction is received (step S907). If the low-resolution printing conditions are not satisfied ("NO" at step S904), then it is determined whether the index is indicative of page feed (step S905). If the answer is "NO", then the program returns to step S901 and processing is continued. If the index is indicative of page feed ("YES" at step S905), then page output is performed at the usual resolution, after which the program returns to step S901 to continue processing.

In accordance with the first embodiment, as described above, conditions for deciding resolution are furnished in the printing apparatus 2, the information processing apparatus 1 creates print data streams from the page indices 71~75 and job index 76, inserts the job index data of the print data streams immediately after the "Printing Environment Setting Instruction Group" of the print data file, and inserts the page index data immediately after respective ones of the page feed codes FF in the print data file. As a result, resolution used at the time the print data file is printed can be determined and changed on a per-page basis in concurrence with execution of print processing.

<Modification of First Embodiment>

A modification of the first embodiment will be described next. The basic processing technique used in this modification is similar to that of the first embodiment and only the processing steps that differ will be described. In this modification, gray level is determined in addition to printing resolution based upon the indices sent to the printing apparatus 1 from the information processing apparatus 1 as part of the print data.

Figure 16:
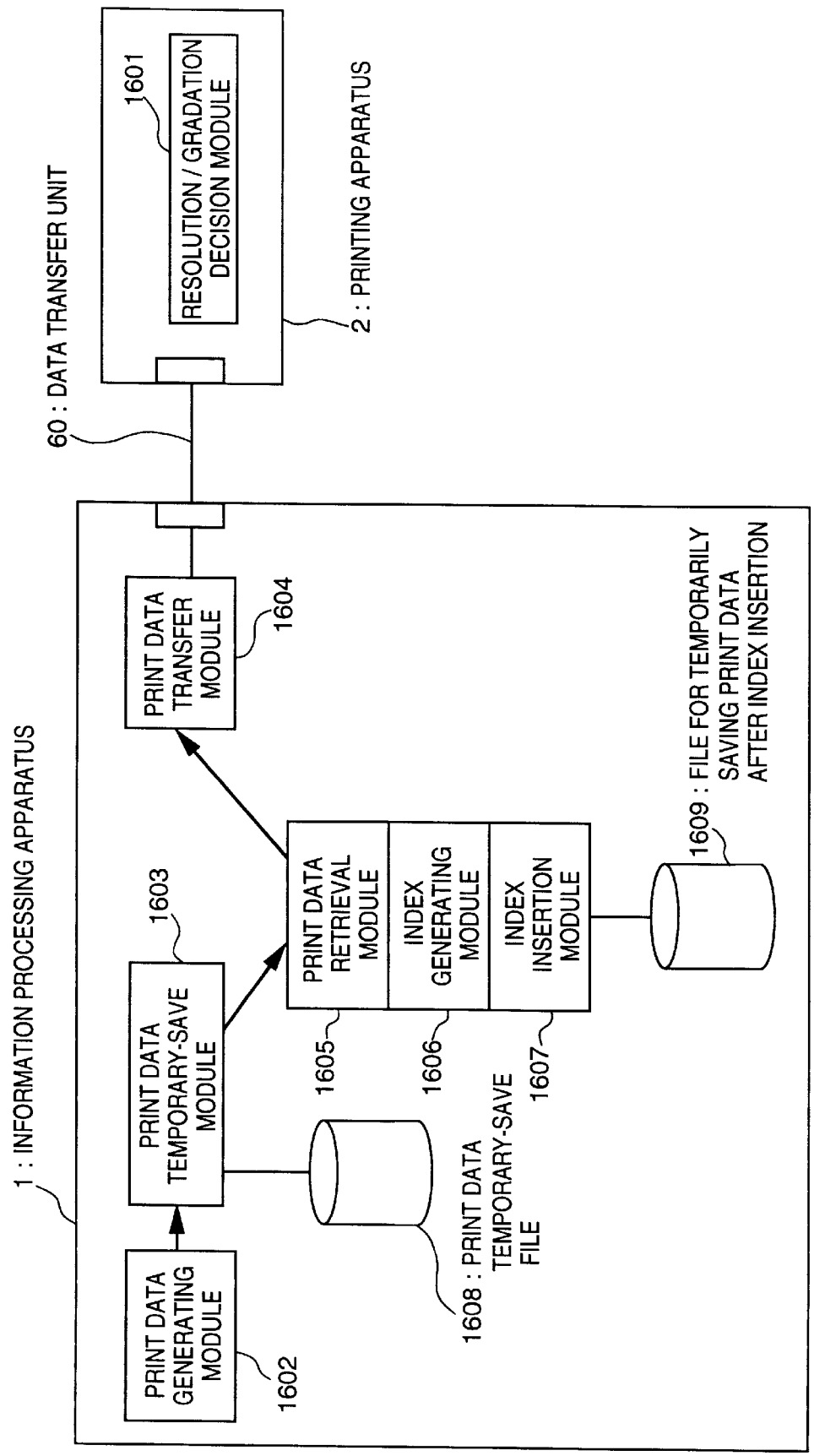
FIG. 16 is a functional block diagram illustrating the hardware architecture according to a modification of the first embodiment of the present invention.

FIG. 16 is a functional block diagram illustrating the internal functions of the hardware architecture according to this modification of the first embodiment of the present invention. Here the printing apparatus 2 is provided with a resolution/gradation decision module 1601 instead of the resolution decision module 51 of FIG. 3.

Figure 17:
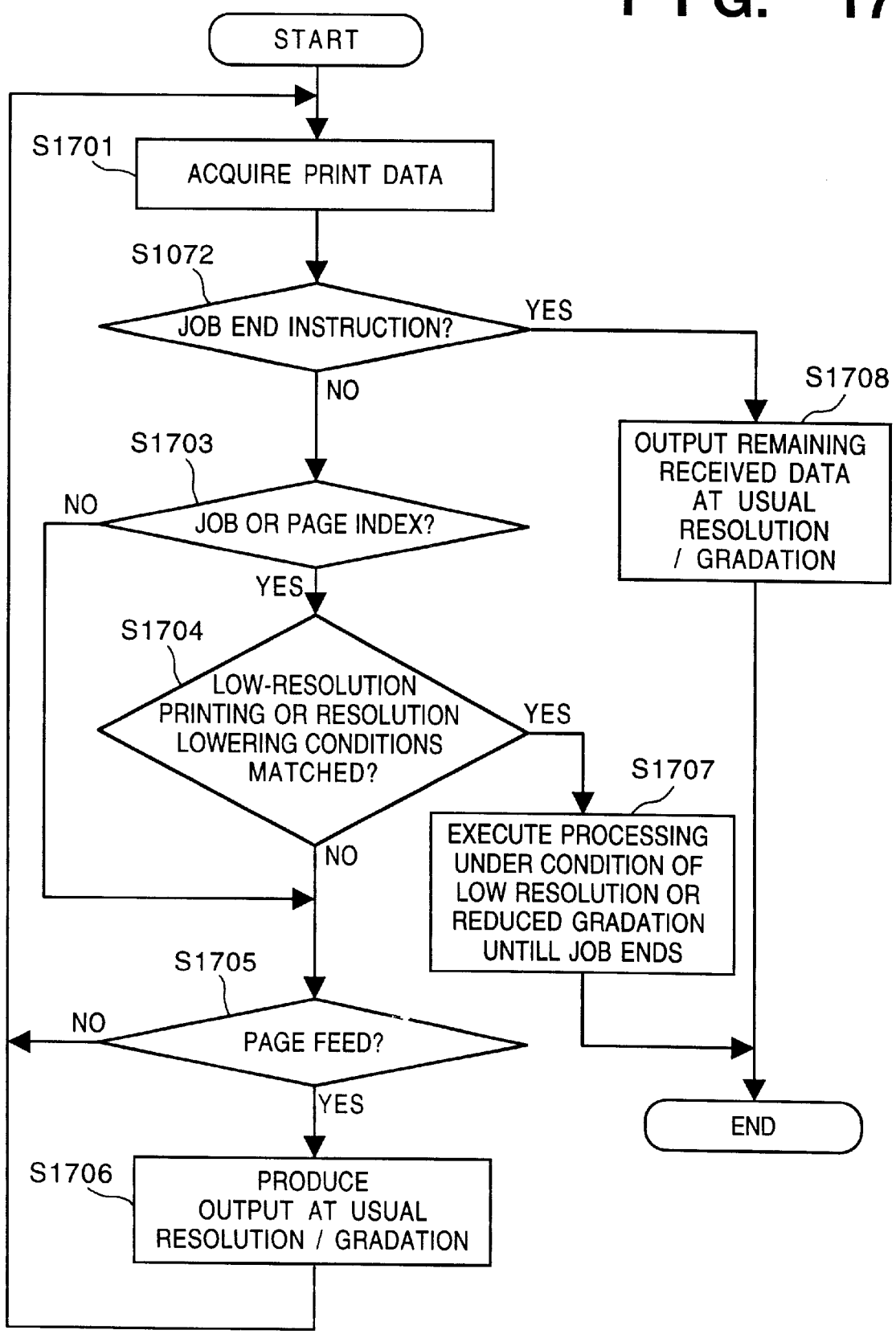
FIG. 17 is a flowchart of processing executed by a printing apparatus according to a modification of the first embodiment of the present invention.

FIG. 17 is a flowchart of processing executed by the printing apparatus 2 according to this modification of the first embodiment.

FIG. 21 is a diagram illustrating gray level deciding conditions according to a modification of the first and second embodiments of the invention.

The processing of the printing apparatus 2 shown in FIG. 17 differs from the flowchart of FIG. 9 mainly in terms of steps S1704 and S1707. Specifically, at step S1704, whether low-resolution printing is to be performed is judged based upon the resolution deciding conditions of FIG. 13 or whether gradation is to be lowered is judged based upon the gray level deciding conditions of FIG. 21. If printing at low resolution or lowering of gradation is to be performed ("YES" at step S1704), then low-resolution printing or lowering of gradation is carried out at step S1707. Processing is executed until the job ends. Other steps in the processing of FIG. 17 are similar to those of the first embodiment and need not be described again.

<Another Modification of First Embodiment>

An another modification of the first embodiment will be described next. The basic processing technique used in this modification is similar to that of the first embodiment and only the construction of the index of print data is differed. In this modification, each page index as described in FIG. 5 is divided into a number of the band index as described in FIG. 28. This modification is suitable for a printing apparatus which uses a band buffer technique.

Figure 30:
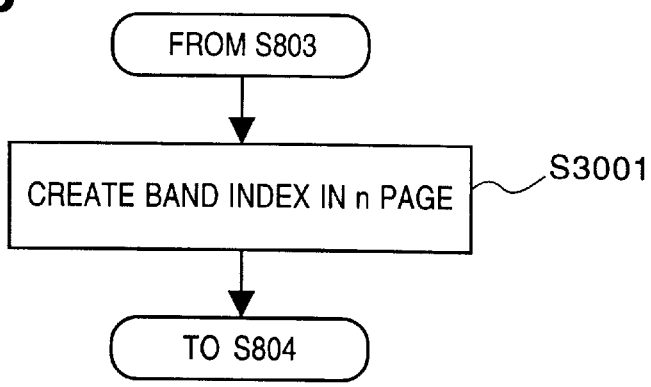
FIG. 30 is a flowchart of processing executed by an information processing apparatus according to the another modification of the first embodiment of the invention.
Figure 31:
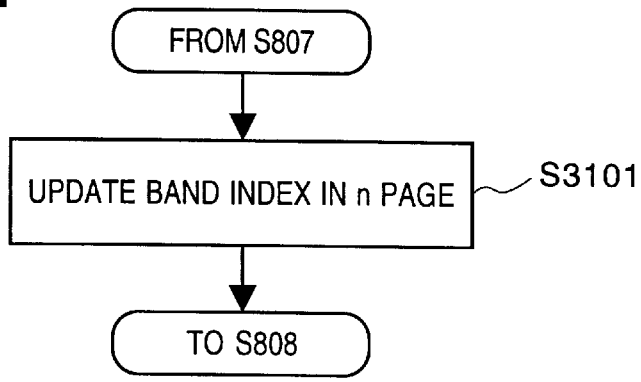
FIG. 31 is a flowchart of processing executed by the information processing apparatus according to the another modification of the first embodiment of the invention.

FIGS. 30 and 31 are different steps from FIG. 8's flowchart of processing executed by the information processing apparatus 1 according to the another modification of the first embodiment of the invention.

Figure 32:
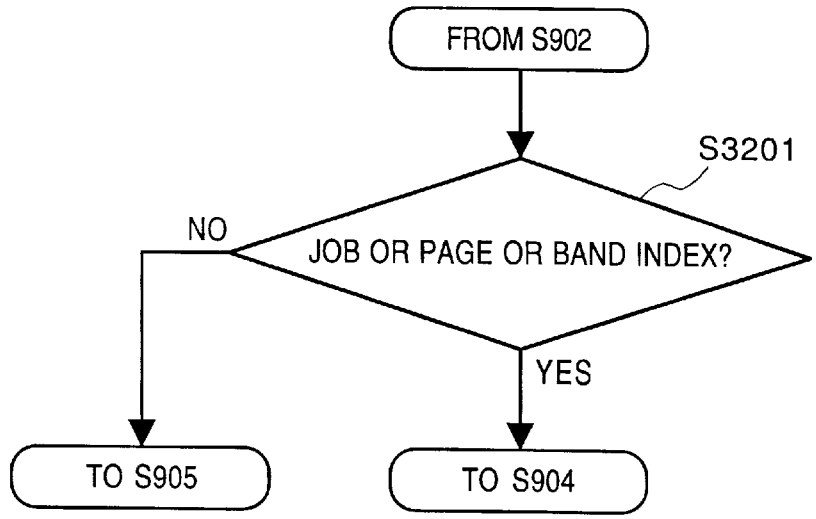
FIG. 32 is a flowchart of processing executed by the printing apparatus according to the another modification of the first embodiment of the invention.

FIG. 32 is a different step from FIG. 9's flowchart of processing executed by the printing apparatus 2 according to the another modification of the first embodiment to the invention.

The processing of the information processing apparatus 1 shown in FIG. 30 differs from the flowchart of FIG. 8 mainly in terms of step S803. Specifically, at step S803, the creating process of the number of band index for N page is added. After S3001 step is done, processing returns to step S804. FIG. 31 also differs from the flowchart of FIG. 8 mainly in terms of step S807. Specifically at step S807, the updating process of a band index in N page is added. After step S3101 step is done, processing returns to step S808.

The processing of the printing apparatus 2 shown in FIG. 32 differs from the flowchart of FIG. 9 mainly in terms of step S903. Specifically, at step S3201, a band index is added for S903, so if the data are not indicative of a "Job End Instruction" ("NO" at step S902), it is determined whether the data indicate a job index or page index or band index or not (S3201). If the data doesn't indicate nay of a job index, page index and band index ("NO" at step S3201), then the processing of step S905 is executed. If the data indicate any of a job index, page index and band index ("YES" at step S3201), then the processing of step S904 executed. Other processing of an another modification of the first embodiment is executed with the same steps shown in FIGS. 8 and 9, and need not be described again.

<Second Embodiment>

A second embodiment of the invention will now be described based on the hardware of FIGS. 1 and 2 with reference to FIGS. 10~13 and FIG. 15.

FIG. 10 is a functional block diagram illustrating the hardware architecture according to a second embodiment of the present invention.

The internal functions of the hardware of FIG. 10 according to the second embodiment are basically the same as those of FIG. 3 according to the first embodiment.

As shown in FIG. 10, the information processing apparatus 1 has a print data generating module 1002 serving as printing processing means, a module 1003 for temporarily saving the print data, a print data transfer module 1004, a print data retrieval module 1005, an index generating module 1006, a file 1007 in which print data are saved, and a file 1008 in which print data are saved after index insertion. The information processing apparatus 1 further includes a resolution decision module 1013, a module 1014 for generating and inserting a resolution lowering command and a file 1015 of resolution deciding conditions. The printing apparatus 2 has a module 1011 for interpreting the resolution lowering command based upon indices sent as part of print data from the information processing apparatus 1 via the data transfer unit 60.

The processing of the second embodiment is basically similar to that of the first embodiment. However, the resolution deciding conditions shown in FIG. 13 are provided in the file 1015 of the information processing apparatus 1. Further, if end of the print data is found at step S806 of FIG. 8 in the operation of the information processing apparatus 1, the processing described below is executed instead of step S811.

Figure 15:
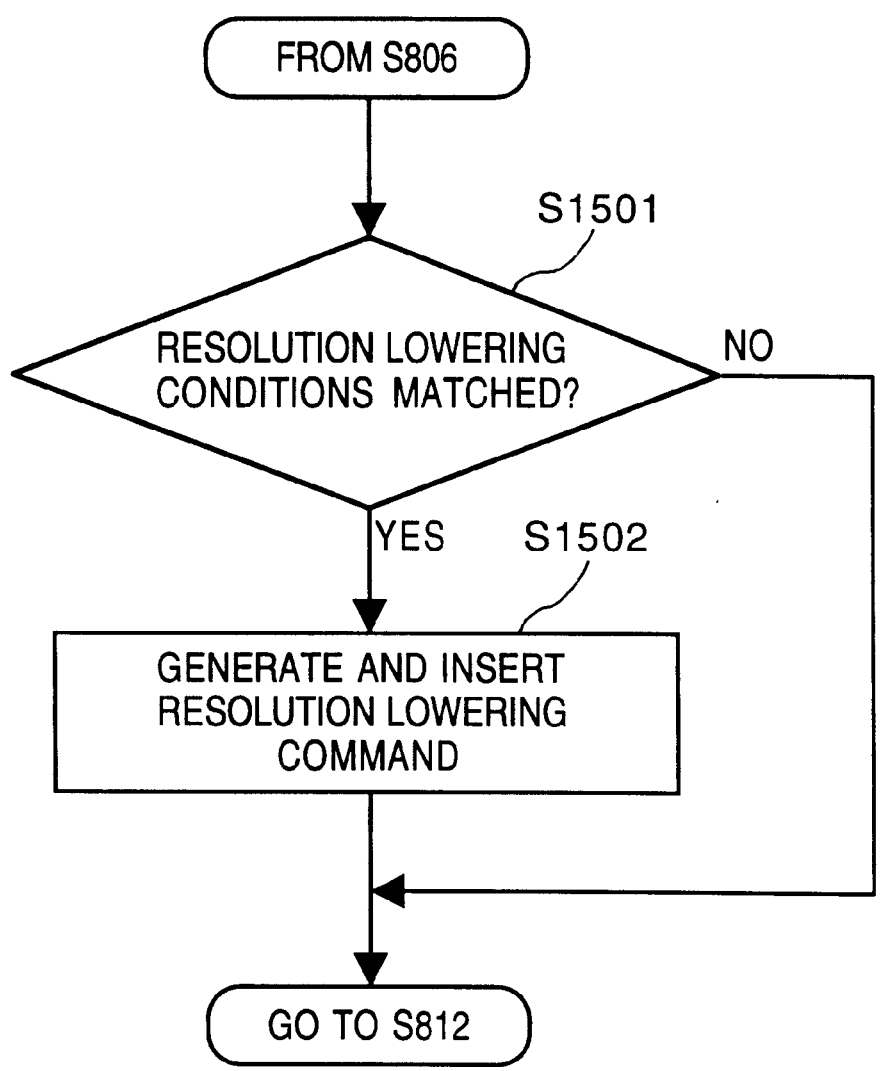
FIG. 15 is a flowchart of processing for lowering resolution according to the second embodiment of the present invention.

FIG. 11 is a diagram illustrating a command for lowering resolution according to the second embodiment of the invention, FIG. 12 is a diagram illustrating an example of print data after insertion of the command for lowering resolution according to the second embodiment of the invention, and FIG. 15 is a flowchart of processing for lowering resolution according to the second embodiment of the present invention.

If end of the print data is found at step S806 of FIG. 8, the processing of FIG. 15 is executed instead of step S811 in FIG. 8. Specifically, whether resolution is to be lowered is determined by the resolution decision module 1013 based upon the file 1015 (FIG. 13) of resolution deciding conditions (step S1511 in FIG. 15). If the conditions of FIG. 13 for lowering resolution have been satisfied, then the module 1014 for generating and inserting the resolution lowering command inserts the resolution lowering command of FIG. 11 immediately after the "Printing Environment Setting Instruction Group" of the print data in the file 1008, as shown in FIG. 12, and generates a file in which the print data having the inserted resolution lowering command is temporarily saved (step S1502). The program then proceeds to step S812 of FIG. 8 so that processing similar to that of the first embodiment is executed. Meanwhile, if the module 1011 for interpreting the resolution lowering command in the printing apparatus 2 which has received the print data determines that the resolution lowering command has been received, the printing apparatus 2 executes printing processing under conditions of lowered resolution. In this case, whether or not the resolution lowering command has been received is determined at step S904 of FIG. 9 instead of determining whether the resolution conditions are satisfied. If the command has not been received, printing is performed at the usual resolution. Processing other than that described above is similar to that of the first embodiment and need not be described again.

In accordance with the second embodiment, as described above, conditions for deciding resolution are furnished in the printing apparatus 2, the decision regarding the resolution of the print data is rendered on a per-printing-job basis and the command for lowering resolution is inserted in the print data file on a per-printing-job basis. As a result, the printing apparatus 2 can be freed from the need to decide resolution at the time of a printing operation, thus making it possible to raise the efficiency of printing processing.

<Modification of Second Embodiment>

A modification of the second embodiment will be described next. The basic processing technique used in this modification is similar to that of the second embodiment and only the processing steps that differ will be described.

In this modification, the above-described resolution deciding conditions (FIG. 13) and gray level deciding conditions (FIG. 21) are provided in the information processing apparatus 1. The latter is capable of inserting a gradation lowering command in the print data based upon the decision regarding gradation and the results of the decision. If the gradation lowering command is contained in print data received by the printing apparatus 2, the latter lowers gradation at the time of printing. Further, according to this modification, if the conditions for deciding resolution or gradation are satisfied, the operator is allowed to select whether printing is to be continued or canceled under lowered resolution and/or gradation.

Figure 18:
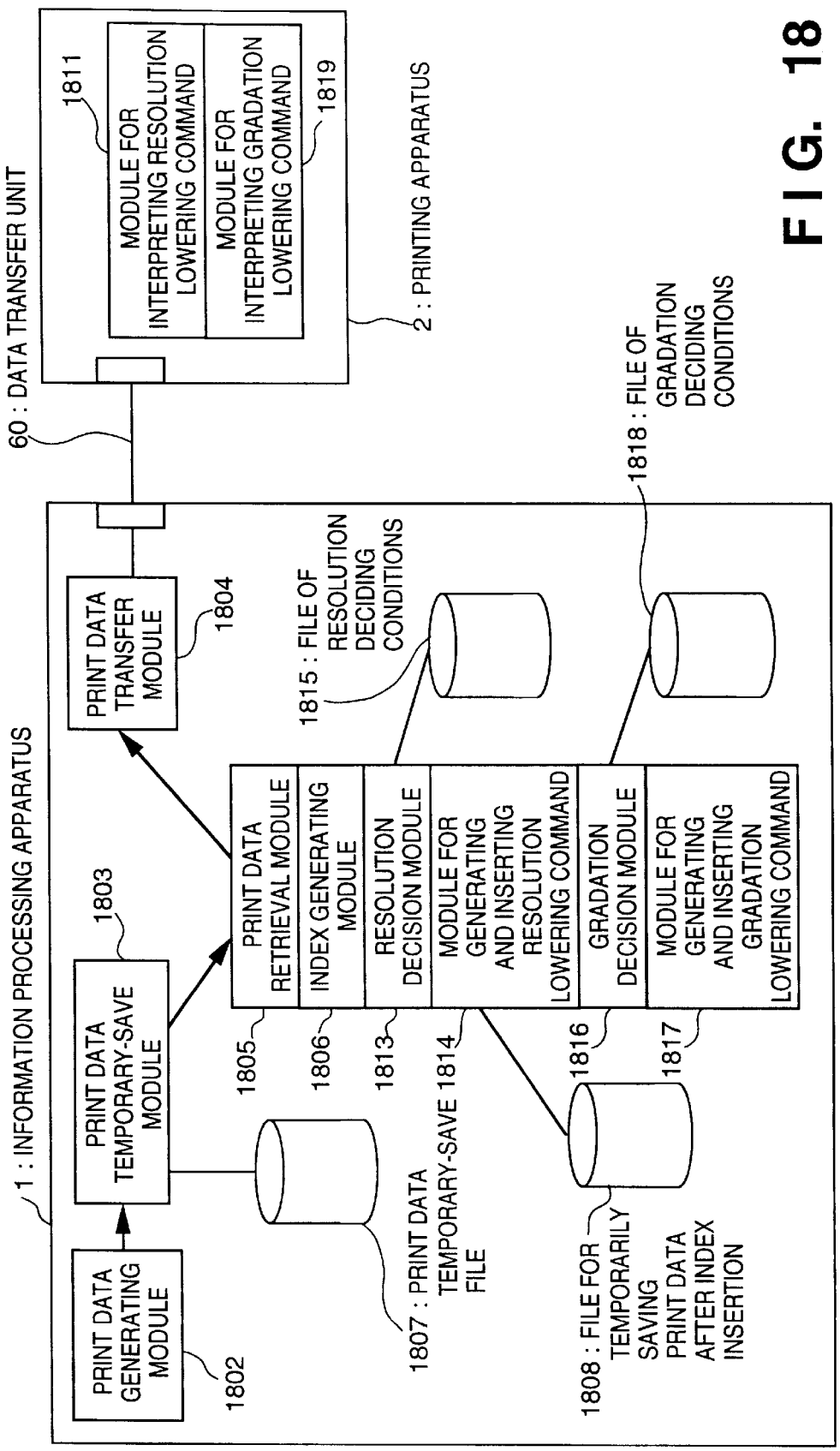
FIG. 18 is a functional block diagram illustrating the hardware architecture according to a modification of the second embodiment of the present invention.

FIG. 18 is a functional block diagram illustrating the internal functions of the hardware architecture according to the modification of the second embodiment of the present invention. This modification differs from the second embodiment (FIG. 10) in that the architecture of the information processing apparatus 1 is further provided with a gradation decision module 1816, a module 1817 for generating and inserting a gradation lowering command and a file 1818 of gray level deciding conditions. Instead of a file 1408 (FIG. 14) in which print data are saved after insertion of the command for lowering resolution, the information processing apparatus 1 is provided with a file 1808 in which print data are saved after index insertion.

FIG. 19 is a command for reducing resolution and a command for reducing gradation according to a modification of the second embodiment of the present invention, FIG. 20 is a diagram showing an example of print data after insertion of the command for lowering resolution according to a modification of the second embodiment of the invention, FIG. 23 is a flowchart illustrating processing for reducing resolution/gradation according to a modification of the second embodiment of the present invention, and FIG. 26 is a diagram illustrating a message screen according to the modification of the second embodiment.

If the print data are found to end at step S806 in FIG. 8, the information processing apparatus 1 executes the following processing instead of step S811: Specifically, as shown in FIG. 23, whether resolution is to be lowered is decided by the resolution decision module 1813 based upon the file 1815 (FIG. 13) of resolution deciding conditions, and whether gradation is to be lowered is decided by the gradation decision module 1816 based upon the file 1818 (FIG. 21) of gray level deciding conditions (step S2301). If the conditions for lowering resolution shown in FIG. 13 or the conditions for lowering gradation shown in FIG. 21 are satisfied ("YES" at step S2301), the information processing apparatus 1 displays the screen of FIG. 26 on the CRT 25, thereby allowing the operator to enter, from the input unit 22, a signal indicating continuation/cancellation of printing under reduced resolution and/or gradation (step S2302 in FIG. 23). If the operator selects "NO", printing is canceled (step S2303 in FIG. 23). If the operator selects "YES", then printing is continued and the module 1814 for generating and inserting the resolution lowering command or the module 1817 for generating and entering the gradation lowering command inserts the resolution lowering command and/or gradation lowering command of FIG. 19 immediately after the "Printing Environment Setting Instruction Group" of the print data in the file 1808, as shown in FIG. 20, and generates a file in which the print data having the inserted resolution/gradation lowering command is temporarily saved (step S2304 in FIG. 23). The program then proceeds to step S812 of FIG. 8 so that processing similar to that of the first and second embodiments is executed.

Meanwhile, if the module 1811 for interpreting the resolution lowering command and the module 1819 for interpreting the gradation lowering command in the printing apparatus 2 which has received the print data determine that the resolution lowering command and/or gradation lowering have/has been received, the printing apparatus 2 executes printing processing under conditions of lowered resolution and/or gradation. In this case, whether or not the command has been received is determined at step S904 of FIG. 9 instead of determining whether the conditions are satisfied. If neither command has been received, printing is performed at the usual resolution. Processing other than that described above is similar to that of the second embodiment and need not be described again.

A third embodiment will now be described based on the hardware of FIGS. 1 and 2 with reference to FIG. 14.

<Third Embodiment>

Figure 14:
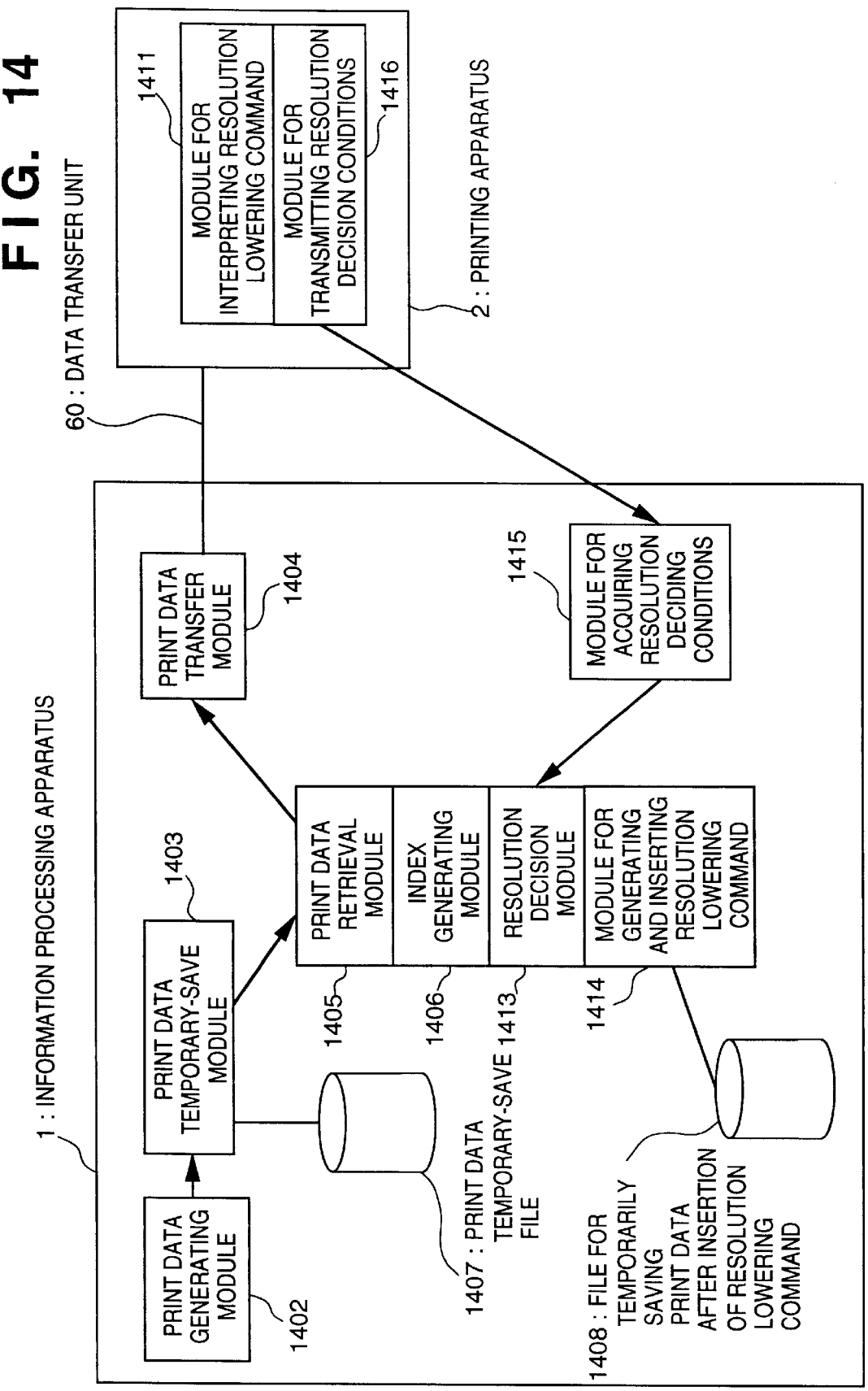
FIG. 14 is a functional block diagram illustrating the hardware architecture re according to a third embodiment of the present invention.

FIG. 14 is a functional block diagram illustrating the internal functions of the hardware architecture according to a third embodiment of the present invention.

As shown in FIG. 14, the internal functions of the hardware of FIG. 14 according to the third embodiment are basically similar to those of the second embodiment shown in FIG. 10. The information processing apparatus 1 has a print data generating module 1402 serving as printing processing means, a module 1403 for temporarily saving the print data, a print data transfer module 1404, a print data retrieval module 1405, an index generating module 1406, a file 1407 in which print data are saved, a file 1408 in which print data are saved after index insertion, a resolution decision module 1413, a module 1414 for generating and inserting a command for lowering resolution, and a module 1415 for acquiring resolution deciding conditions. The printing apparatus 2 has a module 1411 for interpreting the resolution lowering command based upon indices sent as part of print data from the information processing apparatus 1 via the data transfer unit 60, and a module 1416 for transmitting the resolution deciding conditions.

According to the third embodiment, the information processing apparatus 1 is provided with the module 1415 for acquiring resolution deciding conditions instead of the file 1015 of resolution deciding conditions shown in FIG. 10, and the printing apparatus 2 is provided with the module 1416 for transmitting the resolution deciding conditions. The resolution deciding conditions are acquired from the printing apparatus 2 whenever one printing job is started, and the processing of the resolution decision module 1413 is executed using the conditions acquired. Processing other than that described above is similar to that of the first and second embodiments and need not be described again.

In accordance with the third embodiment, as described above, the information processing apparatus 1 is provided with the module 1415 for acquiring resolution deciding conditions and the module 1416 for transmitting the resolution deciding conditions, and the latest resolution deciding conditions are acquired whenever one printing job is started. As a result, the printing apparatus 2 can be freed from the need to decide resolution at the time of a printing operation, thus making it possible to raise the efficiency of printing processing and to realize flexible resolution control on a per-printing-job basis.

<Modification of Third Embodiment>

A modification of the third embodiment will now be described. The basic processing technique used in this modification is similar to that of the first embodiment and only the processing steps that differ will be described.

Figure 22:
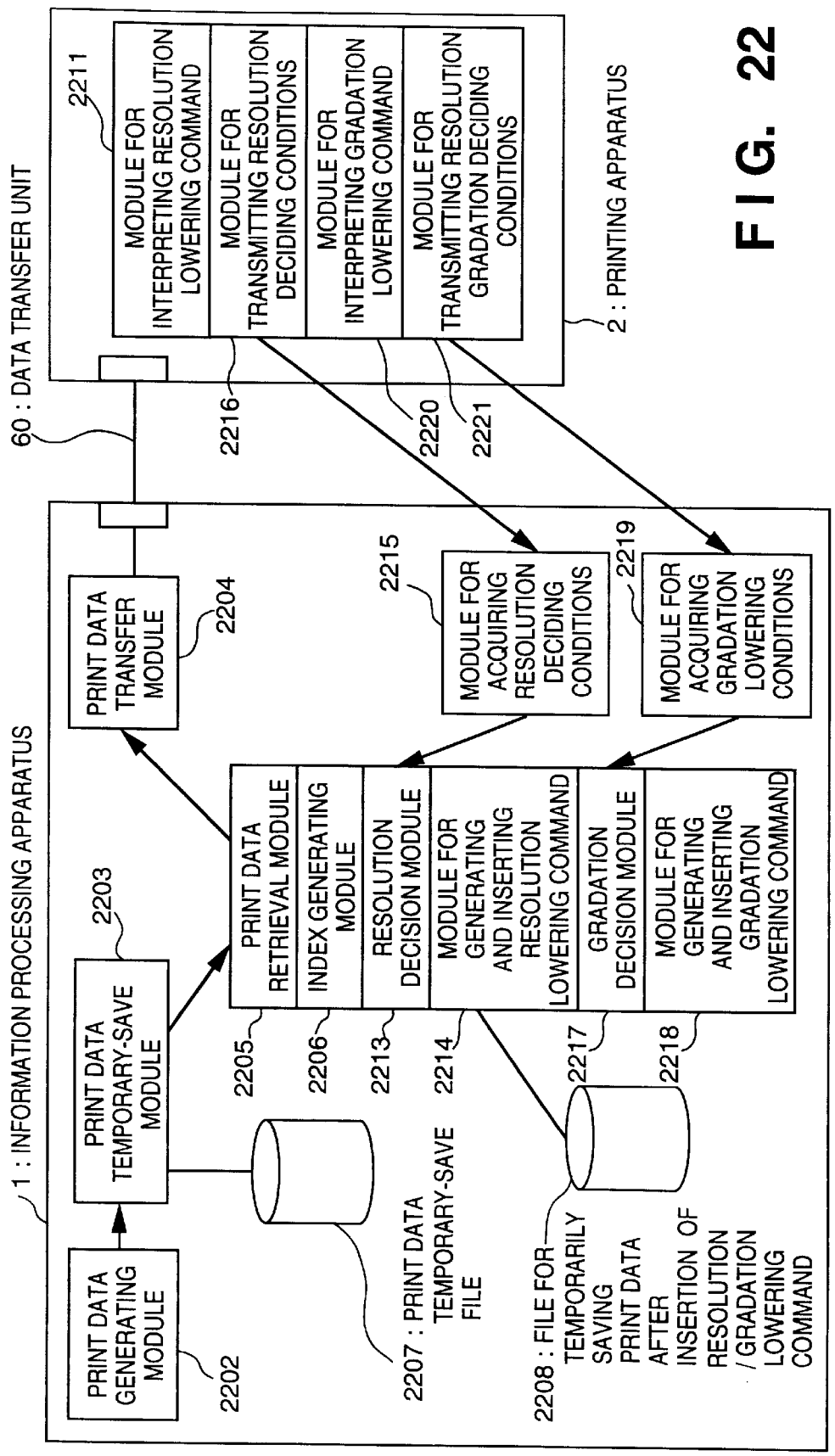
FIG. 22 is a functional block diagram illustrating the hardware architecture according to a modification of the third embodiment of the present invention.

FIG. 22 is a functional block diagram illustrating the internal functions of the hardware architecture according to a modification of the third embodiment of the present invention. This modification differs from the second embodiment (FIG. 10) in that the architecture of the information processing apparatus 1 is further provided with a gradation decision module 2217, a module 2218 for generating and inserting a gradation lowering command and a module 2219 for acquiring gray level deciding conditions. Instead of the file 1408 (FIG. 14) in which print data are saved after insertion of the command for lowering resolution, the information processing apparatus 1 is provided with a file 2208 in which print data are saved after insertion of a command for lowering resolution/gradation. The printing apparatus 2 is further provided with a module 2220 for interpreting the gradation lowering command, and a module 2221 for transmitting the gradation deciding conditions. According to this modification also, if the conditions for deciding resolution or gradation are satisfied, the operator is allowed to select whether printing is to be continued or canceled under lowered resolution and/or gradation. This is similar to the modification of the second embodiment.

According to this embodiment, the information processing apparatus 1 is provided with a module 2215 for acquiring resolution deciding conditions and a module 2219 for acquiring gray level deciding conditions instead of the file 1815 of resolution deciding conditions and the file 1818 of gray level deciding conditions. The printing apparatus 2 is provided with a module 2216 for transmitting resolution deciding conditions and a module 2221 for transmitting gray level deciding conditions. The information processing apparatus 1 acquires the resolution deciding conditions and gradation deciding conditions from the printing apparatus 2 whenever one printing job is started, and the processing of the resolution decision module 2213 and gradation decision module 2217 is executed using the conditions acquired. Processing other than that described above is similar to that of the second embodiment, the modification thereof and the third embodiment.

<Fourth Embodiment>

The hardware architecture of this embodiment is similar to that of FIGS. 1 and 2. However, the processing for lowering resolution and gradation in the information processing apparatus 1 is executed before the print data are transmitted to the printing apparatus 2.

Figure 24:
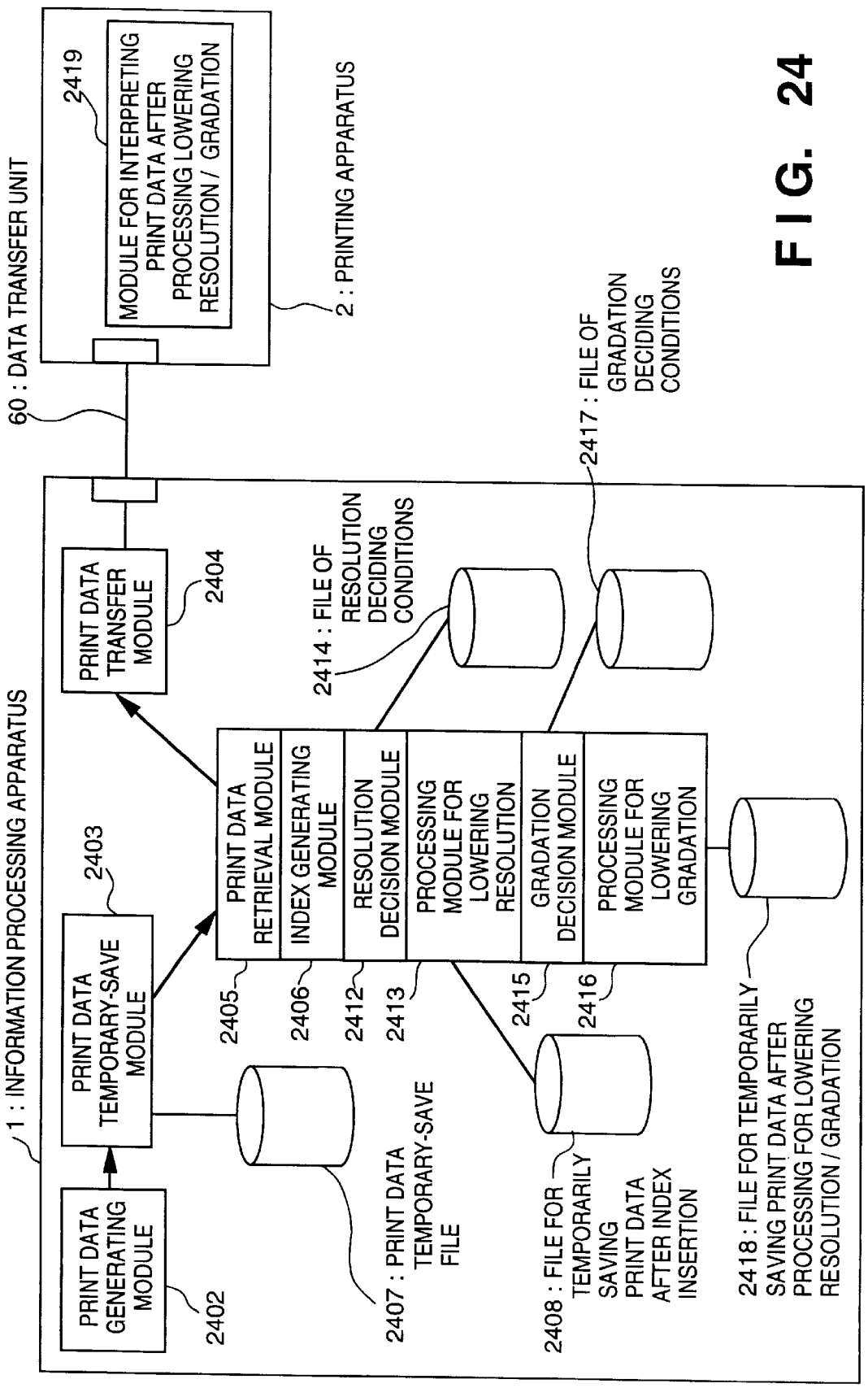
FIG. 24 is a functional block diagram illustrating the hardware architecture according to a fourth embodiment of the present invention.

FIG. 24 is a functional block diagram illustrating the hardware architecture according to a fourth embodiment of the present invention.

The architecture of the information processing apparatus 1 up to the components for deciding resolution and gray level is similar to that of the modification (FIG. 18) of the second embodiment. However, the information processing apparatus 1 is provided with a processing module 2413 for lowering resolution and a processing module 2416 for lowering gradation instead of the module 1814 for generating and inserting the resolution lowering command and the module 1817 for generating and entering the gradation lowering command.

Those processing steps executed by the information processing apparatus 1 that differ from the steps of the flowchart shown in FIG. 8 will be described.

Figure 27:
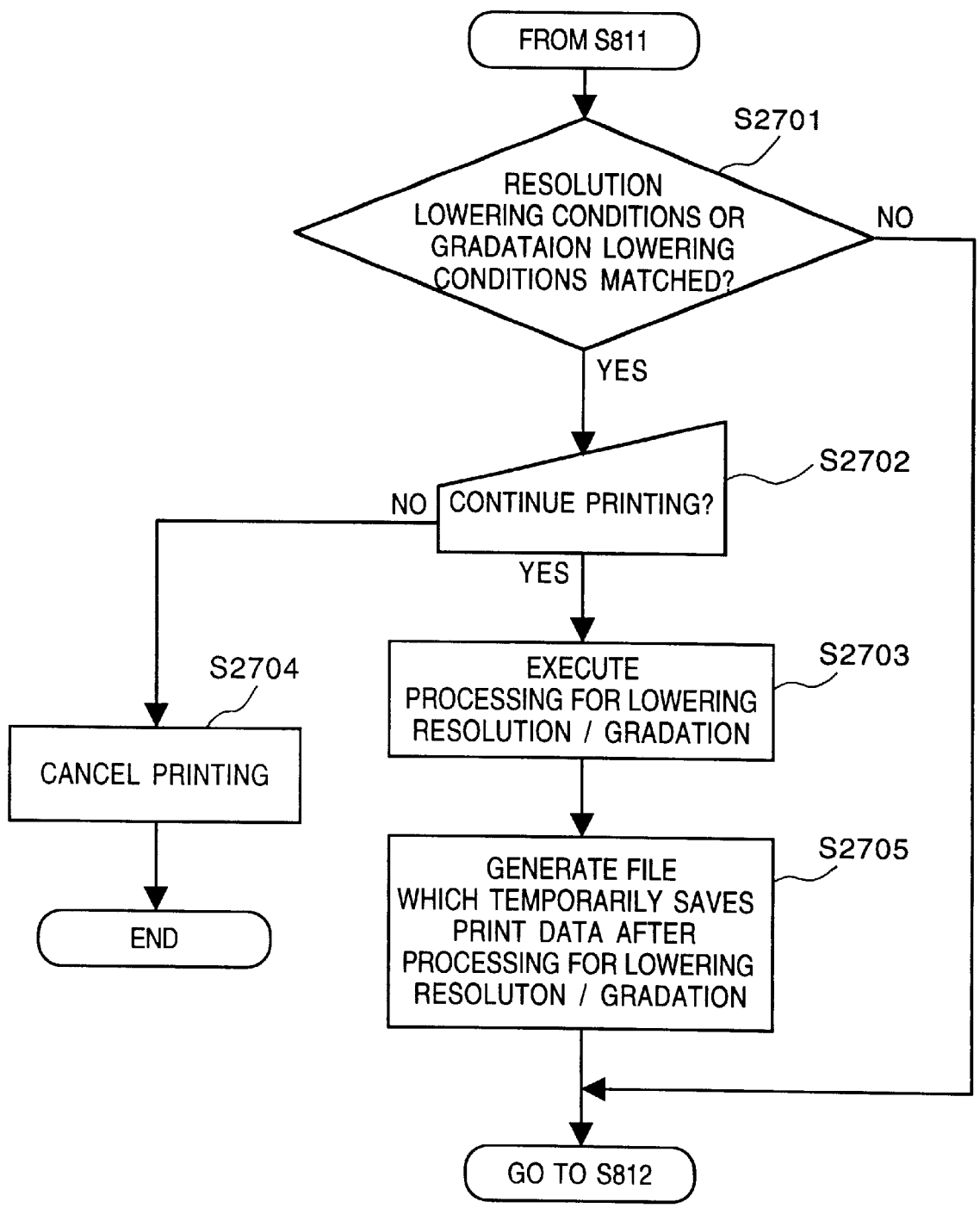
FIG. 27 is a flowchart illustrating processing for reducing resolution/gradation according to the fourth embodiment of the invention.

FIG. 27 is a flowchart illustrating processing for reducing resolution/gradation according to the fourth embodiment of the invention.

If lowering of resolution and/or gradation is detected at step S2701 in FIG. 27 following step S811 in FIG. 8, the information processing apparatus 1 displays the screen of FIG. 26 on the CRT 25, thereby allowing the operator to enter, from the input unit 22, a signal indicating continuation/cancellation of printing under reduced resolution and/or gradation (step S2702). If the operator selects "NO", printing is canceled (step S2704). If the operator selects "YES", then printing is continued and processing for lowering resolution and/or gradation is executed based upon the data in the file 2408 in which the print data having the inserted indices are saved (step S2703). This is followed by generating a file 2418 (step S2705) in which the print data are temporarily saved after undergoing processing for lowering resolution and/or gradation. The processed data are transmitted to the printing apparatus 2 at step S812 in FIG. 8.

The printing apparatus 2 is provided with a module 2419 for interpreting the print data that have been subjected to the processing for lowering resolution/gradation. The printing apparatus 2 executing printing in conformity with the interpreted data.

<Fifth Embodiment>

The architecture of the hardware in this embodiment is similar to that of FIGS. 1 and 2. Here the location to undergo processing for lowering resolution and gradation is decided by the information processing apparatus 1 in dependence upon the memory capacity of the printing apparatus 2.

Figure 25:
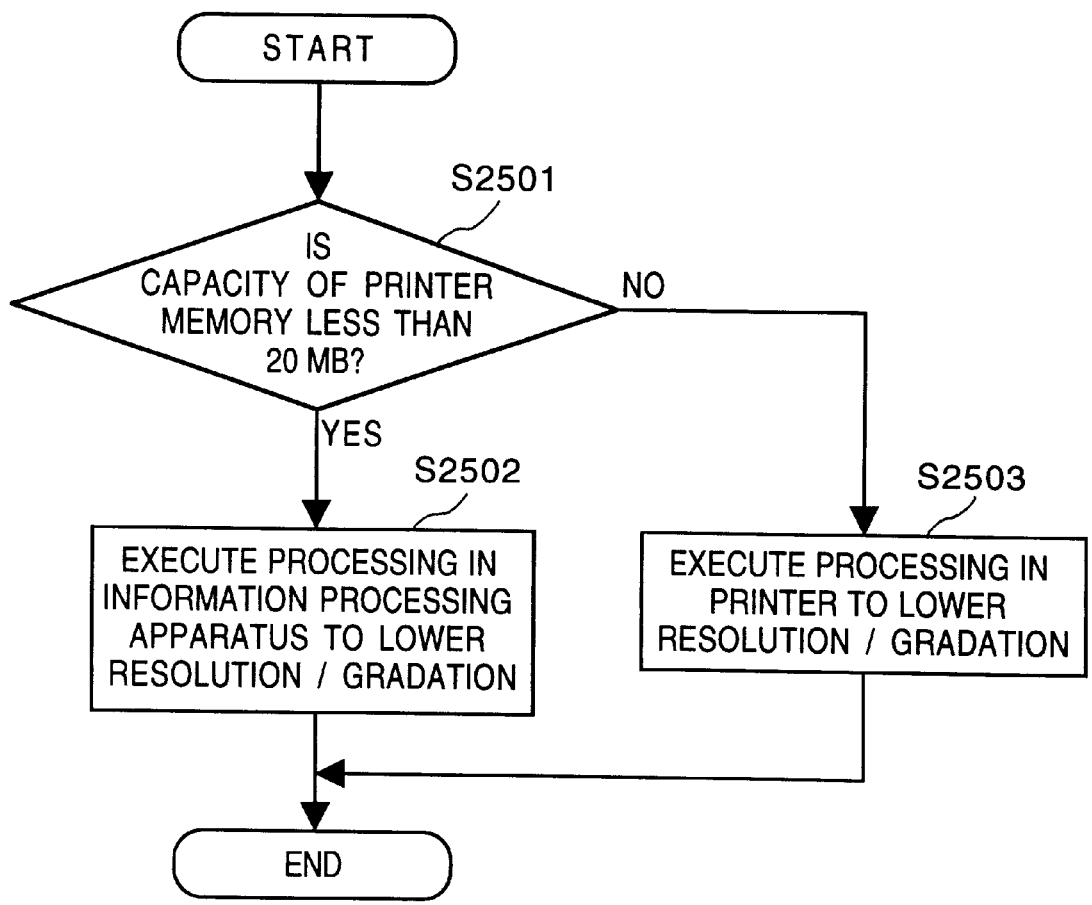
FIG. 25 is a flowchart of an information processing apparatus for deciding where processing for reducing resolution/gradation is executed according a fifth embodiment of the invention.

FIG. 25 is a flowchart of an information processing apparatus for deciding where processing for lowering resolution/gradation is executed according the fifth embodiment of the invention.

As shown in FIG. 25, it is determined whether the memory capacity of the printing apparatus 2 is less than 20 MB (step S2501). If the answer is "YES", then the information processing apparatus 1 executes the processing of the fourth embodiment (FIG. 25) for lowering resolution and/or gradation (step S2502). If the memory capacity is greater than 20 MB ("NO" at step S2501), the printing apparatus 2 executes processing for lowering resolution and/or gradation according to the method of the second embodiment (FIG. 10) or the modification thereof (FIG. 18). It should be noted that the memory capacity of the printing apparatus 2 in this embodiment is acquired by providing the information processing apparatus 1 with a module for acquiring memory capacity and the printing apparatus 2 with a module for transmitting memory capacity. Operation is similar to that performed by the module 1415 for acquiring resolution deciding conditions and the module 1416 for transmitting the resolution deciding conditions. The memory capacity acquired is stored in the RAM 23.

The present invention can be applied to a system constituted by a plurality of devices (e.g., a host computer, interface, reader, printer, etc.) or to an apparatus comprising a single device (e.g., a copier or facsimile machine, etc.), as in the foregoing embodiments.

Further, it goes without saying that the object of the present invention can also be achieved by providing a storage medium storing the program codes of the software for performing the aforesaid functions of the embodiments to a system or an apparatus, reading the program codes with a computer (e.g., a CPU or MPU) of the system or apparatus from the storage medium, then executing the program.

In this case, the program codes read from the storage medium realize the functions of the embodiments, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system (OS) or the like working on the computer performs a part of or the entire process in accordance with the designation of program codes and implements the functions according to the embodiments.

Furthermore, the present invention further covers a case where, after the program codes read from the storage medium are written in a function extension card inserted into the computer or in a memory provided in a function extension unit connected to the computer, a CPU or the like contained in the function extension card or function extension unit performs a part of or the entire process in accordance with the designation of program codes and implements the function of the above embodiments.

The present invention is not limited to the above embodiments and various changes and modifications can be made within the spirit and scope of the present invention. Therefore, to apprise the public of the scope of the present invention, the following claims are made.

What is claimed is:

1. An information processing apparatus for outputting print data to a printer which converts the print data to image data having one of a plurality of grades and performs printing on the basis of the converted image data, the information processing apparatus comprising:

determining means for determining whether or not print data to be output to the printer is capable of being converted to image data having a first grade by the printer before outputting the print data to the printer; and command output means for, when it is determined by said determining means that the print data to be output to the printer is incapable of being converted to image data having the first grade by the printer, outputting a command for causing the printer to convert the print data to image data having a second grade.

2. The information processing apparatus according to claim 1, further comprising obtaining means for obtaining predetermined information regarding the printer from the printer, wherein said determining means determines whether or not the print data to be output to the printer is capable of being converted to the image data having the first grade by the printer, on the basis of the information regarding the printer obtained by said obtaining means.

3. The information processing apparatus according to claim 1, further comprising register means for registering the information regarding the printer in advance, wherein said determining means determines whether or not the print data to be output to the printer is capable of being converted to the image data having the first grade by the printer, on the basis of the information regarding the printer registered by said register means.

4. The information processing apparatus according to claim 1, wherein the first grade and the second grade have different levels of at least one of resolution and gradation.

5. The information processing apparatus according to claim 1, further comprising:

informing means for informing the determination of incapability made by said determining means; and input means for, when the determination of incapability is informed by said informing means, enabling an operator to input a request for printing on the basis of image data having the second grade, wherein said command output means outputs the command to the printer when the request is input by said input means.

6. The information processing apparatus according to claim 1, wherein said determining means determines the print data on a per-job basis, and the printer outputs data on the per-job basis.

7. The information processing apparatus according to claim 1, wherein said determining means determines the print data in a unit of a page, and the printer outputs data in the unit of the page.

8. The information processing apparatus according to claim 1, wherein the print data is outputted to the printer comprising:

conversion means for dividing the print data corresponding to one page into a plurality of bands and converting the print data to image data for each band; and print means for printing the image data converted by said conversion means, wherein the conversion performed by said conversion means to convert the print data to the image data in a band of the plurality of bands, and the printing performed by said print means to print image data in another band of the plurality of bands, are performed in parallel.

9. The information processing apparatus according to claim 1, wherein the print data is outputted to the printer which converts the print data to image data having the first grade or the second grade in accordance with the command.

10. The information processing apparatus according to claim 1, wherein size data for each type of a plurality of objects included in the print data is outputted along with the print data.

11. An information processing method for outputting print data to a printer which converts the print data to image data having one of a plurality of grades and performs printing on the basis of the converted image data, comprising the steps of:

determining whether or not print data to be output to the printer is capable of being converted the print data to image data having a first grade by the printer before outputting the print data to the printer; and outputting, when it is determined in said determining step that the print data to be output to the printer is incapable of being converted to image data having the first grade by the printer, a command for causing the printer to convert the print data to image data having a second grade.

12. The information processing method according to claim 11, further comprising the step of obtaining predetermined information regarding the printer from the printer, wherein in said determining step, it is determined whether or not the print data to be output to the printer is capable of being converted to the image data having the first grade by the printer, on the basis of the information regarding the printer obtained in said obtaining step.

13. The information processing method according to claim 11, further comprising the step of registering the information regarding the printer in advance, wherein in said determining step, it is determined whether or not the print data to be output to the printer is capable of being converted to the image data having the first grade by the printer, on the basis of the information regarding the printer registered in said registering step.

14. The information processing method according to claim 11, wherein the first grade and the second grade have different levels of at least one of resolution and gradation.

15. The information processing method according to claim 11, further comprising the steps of:

informing the determination of incapability made in said determining step; and when the determination of incapability is informed in said informing step, enabling an operator to input a request for printing on the basis of image data having the second grade, wherein in said command outputting step, the command is outputted to the printer when the request is input in said inputting step.

16. The information processing method according to claim 11, wherein in said determining step, the print data is determined on a per-job basis, and the printer outputs data on the per-job basis.

17. The information processing method according to claim 11, wherein in said determining step, the print data is determined in a unit of a page, and the printer outputs data in the unit of the page.

18. The information processing method according to claim 11, comprising the steps of:

outputting the print data to the printer;

dividing the print data corresponding to one page into a plurality of bands and converting the divided print data to image data for each band; and printing the image data converted in said converting step, wherein the printer performs the conversion performed in said converting step to convert the print data to the image data in a band of the plurality of bands, in parallel with the printing performed in said printing step to print image data in another band of the plurality of bands.

19. The information processing method according to claim 11, wherein the print data is outputted to the printer which converts the print data to image data having the first grade or the second grade in accordance with the command.

20. The information processing method according to claim 11, wherein size data for each type of a plurality of objects included in the print data is outputted along with the print data.

21. Computer executable process steps stored on a computer readable medium, for outputting print data to a printer which converts the print data to image data having one of a plurality of grades and performs printing on the basis of the converted image data, said process steps comprising the steps of:

determining whether or not print data to be output to the printer is capable of being converted to image data having a first grade by the printer before outputting the print data to the printer; and outputting, when it is determined in said determining step that the print data to be output to the printer is incapable of being converted to image data having the first grade by the printer, a command for causing the printer to convert the print data to image data having a second grade.

22. The computer executable process steps according to claim 21, further comprising the step of obtaining predetermined information regarding the printer from the printer, wherein, in said determining step, it is determined whether or not the print data to be output to the printer is capable of being converted to the image data having the first grade by the printer, on the basis of the information regarding the printer obtained in said obtaining step.

23. The computer executable process steps according to claim 21, further comprising the step of registering the information regarding the printer in advance, wherein, in said determining step, it is determined whether or not the print data to be output to the printer is capable of being converted to the image data having the first grade by the printer, on the basis of the information regarding the printer registered in said registering step.

24. The computer executable process steps according to claim 21, wherein the first grade and the second grade have different levels of at least one of resolution and gradation.

25. The computer executable process steps according to claim 21, further comprising the steps of:

informing the determination of incapability made in said determining step; and enabling, when the determination of incapability is informed in said informing step, an operator to input a request for printing on the basis of image data having the second grade, wherein in said command outputting step, the command is outputted to the printer when the request is input in said inputting step.

26. The computer executable process steps according to claim 21, wherein in said determining step, the print data is determined on a per-job basis, and the printer outputs data on the per-job basis.

27. The computer executable process steps according to claim 21, wherein in said determining step, the print data is determined in a unit of a page, and the printer outputs data in the unit of the page.

28. The computer executable process steps according to claim 21, further comprising the step of outputting the print data to the printer which divides the print data corresponding to one page into a plurality of bands, converts the print data to image data for each band, and prints the converted image data, wherein the printer performs the conversion to the image data in a band of the plurality of bands in parallel with the printing of the image data in another band of the plurality of bands.

29. The computer executable process steps according to claim 21, further comprising the step of outputting the print data to the printer which converts the print data to image data having the first grade or the second grade in accordance with the command.

30. The computer executable process steps according to claim 21, further comprising the step of outputting print size data for each type of a plurality of objects included in the print data, along with the print data.

31. A print system comprising:

a printer for converting print data to image data having one of a plurality of grades and for printing the image data; and an information processing apparatus for outputting the print data, said information processing apparatus being connected to said printer and via communication means, wherein said information processing apparatus includes determining means for determining whether or not print data to be output to the printer is capable of being converted to image data having a first grade by the printer before outputting the print data to the printer; and command output means for, when it is determined by said determining means that the print data to be output to the printer is incapable of being converted to image data having the first grade by the printer, outputting a command for causing the printer to convert to image data having a second grade and performs printing on the basis of the converted image data, and said printer includes conversion means for, when the command is received, converting the print data to image data having the second grade.

32. The print system according to claim 31, wherein said information processing apparatus further includes obtaining means for obtaining predetermined information regarding the printer from the printer, wherein said determining means determines whether or not the print data to be output to the printer is capable of being converted to the image data having the first grade by the printer, on the basis of the information regarding the printer obtained by said obtaining means.

33. The print system according to claim 31, wherein said information processing apparatus further includes register means for registering the information regarding the printer in advance, wherein said determining means determines whether or not the print data to be output to the printer is capable of being converted to the image data having the first grade by the printer, on the basis of the information regarding the printer registered by said register means.

34. The print system according to claim 31, wherein the first grade and the second grade have different levels of at least one of resolution and gradation.

35. The print system according to claim 31, wherein said information processing apparatus further includes informing means for informing the determination of incapability made by said determining means; and input means for, when the determination of incapability is informed by said informing means, enabling an operator to input a request for printing on the basis of image data having the second grade, wherein said command output means outputs the command to the printer when the request is input by said input means.

36. The print system according to claim 31, wherein said determining means determines the print data on a per-job basis, and the printer outputs data on the per-job basis.

37. The print system according to claim 31, wherein said determining means determines the print data in a unit of a page, and the printer outputs data in the unit of the page.

38. The print system according to claim 31, wherein said printer further includes conversion means for dividing the print data corresponding to one page into a plurality of bands and converting the print data to image data for each band; and print means for printing the image data converted by said conversion means, wherein the conversion performed by said conversion means to convert the print data to the image data in a band of the plurality of bands, and the printing performed by said print means to print image data in another band of the plurality of bands, are performed in parallel.

39. The print system according to claim 31, wherein said printer converts the print data to image data having the first grade or the second grade in accordance with the command and performs printing, and said information processing apparatus outputs the print data to said printer.

40. The print system according to claim 31, wherein said information processing apparatus outputs size data for each type of a plurality of objects included in the print data, along with the print data.

41. An information processing apparatus for outputting print data to a printer which converts the print data to image data having one of a plurality of grades and performs printing on the basis of the converted image data, the information processing apparatus comprising:

obtaining means for obtaining information regarding the printer;

determining means for determining whether or not print data to be output to the printer is capable of being converted to image data having a first grade by the printer, on the basis of the information regarding the printer obtained by said obtaining means; and command output means for, when it is determined by said determining means that the print data to be output to the printer is incapable of being converted to image data having the first grade by the printer, outputting a command for causing the printer to convert the print data to image data having a second grade.

42. The information processing apparatus according to claim 41, wherein said obtaining means includes receiving means for receiving the information regarding the printer from the printer.

43. The information processing apparatus according to claim 41, wherein the first grade and the second grade have different levels of at least one of resolution and gradation.

44. The information processing apparatus according to claim 41, further comprising:
informing means for informing the determination of incapability made by said determining means; and
input means for, when the determination of incapability is informed by said informing means, enabling an operator to input a request for printing on the basis of image data having the second grade,
wherein said command output means outputs the command to the printer when the request is input by said input means.

45. The information processing apparatus according to claim 41, wherein said determining means determines whether or not the print data to be output to the printer is capable of being converted to image data having a first grade by the printer on a per-job basis or in a unit of a page.

46. An information processing method for outputting print data to a printer which converts the print data to image data having one of a plurality of grades and performs printing on the basis of the converted image data, comprising the steps of:
obtaining information regarding the printer;
determining whether or not print data to be output to the printer is capable of being converted to image data having a first grade by the printer, on the basis of the information regarding the printer obtained in said obtaining step; and
outputting, when it is determined in said determining step that the print data to be output to the printer is incapable of being converted to image data having the first grade by the printer, a command for causing the printer to convert the print data to image data having a second grade.

47. The information processing method according to claim 46, wherein said obtaining step, the information regarding the printer is received from the printer.

48. The information processing method according to claim 46, wherein the first grade and the second grade have different levels of at least one of resolution and gradation.

49. The information processing method according to claim 46, further comprising the steps of:
informing at least the determination of incapability made in said determining step; and
when the determination of incapability is informed in said informing step, enabling an operator to input a request for printing on the basis of image data having the second grade,
wherein in said command outputting step, the command is outputted to the printer when the request is input.

50. The information processing method according to claim 46, wherein in said determining step, it is determined whether or not the print data to be output to the printer is capable of being converted to image data having a first grade by the printer on a per-job basis or in a unit of a page.

51. Computer executable process steps stored on a computer readable medium, for outputting print data to a printer which converts the print data to image data having one of a plurality of grades and performs printing on the basis of the converted image data, said process steps comprising the steps of:
obtaining information regarding the printer;
determining whether or not print data to be output to the printer is capable of being converted to image data having a first grade by the printer, on the basis of the information regarding the printer obtained in said obtaining step; and
outputting, when it is determined in said determining step that the print data to he output to the printer is incapable of being converted to image data having the first grade by the printer, a command for causing the printer to convert the print data to image data having a second grade.

52. The computer executable process steps according to claim 51, wherein in said obtaining step, the information regarding the printer is received from the printer.

53. The computer executable process steps according to claim 51, wherein the first grade and the second grade have different levels of at least resolution and gradation.

54. The computer executable process steps according to claim 51, further comprising the steps of:
informing the determination of incapability made in said determining step; and
enabling, when the determination of incapability is informed in said informing step, an operator to input a request for printing on the basis of image data having the second grade,
wherein in said command outputting step, the command is outputted to the printer when the request is input.

55. The computer executable process steps according to claim 51, wherein in said determining step, it is determined whether or not the print data to be output to the printer is capable of being converted to image data having a first grade by the printer on a per-job basis or in a unit of a page.

56. A print system comprising:
an information processing apparatus for outputting the print data; and
a printer for converting the print data to image data having one of a plurality of grades and for printing the image data,
wherein said information processing apparatus includes
obtaining means for obtaining information regarding the printer;
determining means for determining whether or not print data to be output to the printer is capable of being converted to image data having a first grade by the printer, on the basis of the information regarding the printer obtained by said obtaining means; and
command output means for, when it is determined by said determining means that the print data to be output to the printer is incapable of being converted to image data having the first grade by the printer, outputting a command for causing the printer to convert to image data having a second grade and perform printing on the basis of the converted image data, and
said printer includes conversion means for, when the command is received, converting the print data to image data having the second grade.

57. The print system according to claim 56, wherein said obtaining means includes means for receiving the information regarding the printer from the printer.

58. The print system according to claim 56, wherein said information processing apparatus further includes register means for registering the information regarding the printer in advance, wherein said determining means determines whether or not the print data to be output to the printer is capable of being converted to the image data having the first grade by the printer, on the basis of the information regarding the printer registered by said register means.

59. The print system according to claim 56, wherein the first grade and the second grade have different levels of at least one of resolution and gradation.

60. The print system according to claim 56, wherein said information processing apparatus further includes informing means for informing the determination of incapability made by said determining means; and input means for, when the determination of incapability is informed by said informing means, enabling an operator to input a request for printing on the basis of image data having the second grade, wherein said command output means outputs the command to the printer when the request is input by said input means.

61. The print system according to claim 56, wherein said determining means determines the print data on a per-job basis, and the printer prints the image data on the per-job basis.

62. The print system according to claim 56, wherein said determining means determines the print data in a unit of a page, and the printer prints the image data in the unit of the page.

63. The print system according to claim 56, wherein said information processing apparatus that outputs the print data to said printer includes conversion means for dividing the print data corresponding to one page into a plurality of bands and converting the print data to image data for each band, and print means for printing the image data converted by said conversion means, wherein the conversion performed by said conversion means to convert the print data to the image data in a band of the plurality of bands, and the printing performed by said print means to print image data in another band of the plurality of bands, are performed in parallel.

64. The print system according to claim 56, wherein said printer converts the print data to image data having the first grade or the second grade in accordance with the command and performs printing, and said information processing apparatus outputs the print data to said printer.

65. The print system according to claim 56, wherein said information processing apparatus outputs size data for each type of a plurality of objects included in the print data, along with the print data.

66. A printing method for outputting print data from an image processing apparatus to a printer which converts the print data to image data having one of a plurality of grades and performs printing on the basis of the converted image data, comprising the steps of:

obtaining information regarding the printer to the image processing apparatus;

determining, by the image processing apparatus, whether or not print data to be output to the printer is capable of being converted to image data having a first grade by the printer, on the basis of the information regarding the printer obtained in said obtaining step; and outputting, from the image processing apparatus to the printer, when it is determined in said determining step that the print data to be output to the printer is incapable of being converted to image data having the first grade by the printer, a command for causing the printer to convert to image data having a second grade, converting, by the printer, the print data to image data having the second grade when the command is received, and performing printing, by the printer, on the basis of the converted image data.

67. The printing method according to claim 66, wherein in said obtaining step, the information regarding the printer is received from the printer.

68. The printing method according to claim 66, further comprising a register step for registering the information regarding the printer in advance, and wherein, in said determining step, it is determined whether or not the print data to be output to the printer is capable of being converted to the image data having the first grade by the printer on the basis of the information regarding the printer registered in said register step.

69. The printing method according to claim 66, wherein the first grade and the second grade have different levels of at least one of resolution and gradation.

70. The printing method according to claim 66, further comprising the steps of:

informing the determination of incapability made in said determining step; and enabling, when the determination of incapability is informed in said informing step, an operator to input a request for printing on the basis of image data having the second grade, wherein in said command output step, the command is output to the printer when the request is input.

71. The printing method according to claim 66, wherein in said determining step, the print data is determined on a per-job basis, and in said performing printing step, printing is performed on the per-job basis.

72. The printing method according to claim 66, wherein in said determining step, the print data is determined in a unit of a page, and in said performing printing step, printing is performed in the unit of the page.

73. The printing method according to claim 66, wherein said converting step includes steps for dividing the print data corresponding to one page into a plurality of bands and converting the print data to image data for each band, the image data converted in said conversion step is printed in said performing printing step, and the conversion performed in said conversion step to convert the print data to the image data in a band of the plurality of bands, and the printing performed in said performing printing step to print image data in another band of the plurality of bands, are performed in parallel.

74. The printing method according to claim 66, wherein in said converting step, the print data is converted to image data having the first grade or the second grade in accordance with the command.

75. The printing method according to claim 66, wherein in said outputting step, size data for each type of a plurality of objects included in the print data is output along with the print data.

* * * * *

UNITED STATES PATENT AND TRADEMARK OFFICE
CERTIFICATE OF CORRECTION

PATENT NO. : 6,009,241

DATED : December 28, 1999

INVENTOR(S) : HIROKAZU KAWAMOTO

Page 1 of 2

It is certified that error appears in the above-identified patent and that said Letters Patent is hereby corrected as shown below:

ON TITLE PAGE AT [57] ABSTRACT

Line 8, "at" should read --at the--.

COLUMN 1

Line 23, "uses." should read --is used.--;
Line 27, "transmitting" should read --transmitting of--;
Line 30, "these" should read --this--;
Line 33, "can't" should read --cannot--;
Line 34, "situation" should read --situations--;
Line 38, "then" should read --than--;
Line 40, "isn't" should read --is not--; and "takes" should read --it takes--.

COLUMN 3

Line 43, "re" should be deleted.

COLUMN 4

Line 12, "a" should read --to a--;
Line 22, "the" (first occurrence) should be deleted;
Line 28, "the" should be deleted;
Line 31, "the" should be deleted;
Line 34, "the" should be deleted.

COLUMN 5

Line 23, "represent" should read --represents--.

COLUMN 7

Line 58, "An another" should read --Another--.

UNITED STATES PATENT AND TRADEMARK OFFICE
CERTIFICATE OF CORRECTION

PATENT NO. : 6,009,241

DATED : December 28, 1999

INVENTOR(S) : HIROKAZU KAWAMOTO

It is certified that error appears in the above-identified patent and that said Letters Patent is hereby corrected as shown below:

<u>COLUMN 15</u>

Line 18, "the print data" should be deleted.

Signed and Sealed this

Seventeenth Day of April, 2001

Attest:

NICHOLAS P. GODICI

Attesting Officer

Acting Director of the United States Patent and Trademark Office